: US 9,042,835 B2
(45) Date of Patent: May 26, 2015

(12) United States Patent
Sågfors et al.

(54) MEASUREMENT HANDLING WITH CARRIER AGGREGATION

(75) Inventors: Mats Sågfors, Kyrkslätt (FI); Walter Müller, Upplands Väsby (SE)

(73) Assignee: OPTIS CELLULAR TECHOLOGY, LLC, Plano, TX (US)

( * ) Notice: Subject to any disclaimer, the term of this patent is extended or adjusted under 35 U.S.C. 154(b) by 142 days.

(21) Appl. No.: 12/972,460

(22) Filed: Dec. 18, 2010

(65) Prior Publication Data

US 2011/0212693 A1 Sep. 1, 2011

Related U.S. Application Data

(63) Continuation of application No. PCT/EP2010/069619, filed on Dec. 14, 2010.

(60) Provisional application No. 61/293,875, filed on Jan. 11, 2010.

(51) Int. Cl.
*H04L 12/26* (2006.01)
*H04W 36/00* (2009.01)
*H04W 72/04* (2009.01)

(52) U.S. Cl.
CPC ........ *H04W 36/0083* (2013.01); *H04W 72/042* (2013.01)

(58) Field of Classification Search
USPC ........... 455/67.11, 561, 550.1, 458, 436, 522, 455/456.1, 68, 352, 91; 370/310, 331, 329, 370/242, 241, 311, 281, 255, 277; 375/260, 375/295
See application file for complete search history.

(56) References Cited

U.S. PATENT DOCUMENTS

| 8,526,322 | B2 * | 9/2013 | Jung et al. ...................... 370/252 |
| 2004/0162074 | A1 * | 8/2004 | Chen ............................. 455/437 |
| 2006/0120330 | A1 * | 6/2006 | Lee ................................ 370/331 |
| 2008/0057934 | A1 * | 3/2008 | Sung et al. ................. 455/422.1 |
| 2008/0311910 | A1 * | 12/2008 | Ishii et al. ..................... 455/436 |
| 2009/0010186 | A1 * | 1/2009 | Li et al. ......................... 370/310 |
| 2009/0270103 | A1 | 10/2009 | Pani et al. |
| 2009/0316659 | A1 * | 12/2009 | Lindoff et al. ................ 370/332 |
| 2010/0099105 | A1 | 9/2010 | Zhang et al. |
| 2010/0322185 | A1 * | 12/2010 | Park et al. ..................... 370/331 |

(Continued)

FOREIGN PATENT DOCUMENTS

WO 2010/099105 A1 9/2010

OTHER PUBLICATIONS

EPO, Int'l Search Report in PCT/EP2010/069619, Feb. 22, 2011.

(Continued)

*Primary Examiner* — Ganiyu A Hanidu
(74) *Attorney, Agent, or Firm* — Vincent J. Allen; Stephen Y. Liu; Carstens & Cahoon, LLP

(57) ABSTRACT

Measurement handling is of interest in a user equipment (UE) in connected mode, with the UE being configured with multiple downlink component carriers (CCs). The UE evaluates the signal quality of a specific CC of the configured CCs against a configurable threshold to determine the need for neighbor cell measurements. The UE performs neighbor cell measurements if the signal quality of the specific CC is below the configurable threshold. In this way, robust and efficient measurement handling is provided, even though the UE is configured with multiple component carriers.

26 Claims, 23 Drawing Sheets

(56) References Cited

U.S. PATENT DOCUMENTS

| | | | |
|---|---|---|---|
| 2011/0002281 A1* | 1/2011 | Terry et al. | 370/329 |
| 2011/0142009 A1* | 6/2011 | Lindoff et al. | 370/332 |
| 2011/0190011 A1* | 8/2011 | Choi et al. | 455/466 |

OTHER PUBLICATIONS

EPO, Written Opinion in PCT/EP2010/069619, Feb. 22, 2011.
Huawei, CA Cell Operations, 3GPP Tdoc R2-094749, Aug. 24, 2009, TSG RAN WG2 Meeting #67, Shenzen, CN.
Huawei, Measurement Consideration in CA, 3GPP Tdoc R2-096495, Nov. 9, 2009,TSG RAN WG2 Meeting #68, Jeju, KR.
ETSI MCC, Report of 3GPP TSG RAN WG2 meeting #67bis, 3GPP Tdoc R2-097514, Nov. 9, 2009, TSG RAN WG2 Meeting #68, Jeju, KR.
ETSI MCC, Report of 3GPP TSG RAN WG2 meeting #68, 3GPP Tdoc R2-100826, Jan. 18, 2010, TSG RAN WG2 Meeting #68bis, Valencia, ES.
Ericsson et al., Carrier Aggregation and the s-Measure Criterion, 3GPP Tdoc R2-101998, Apr. 6, 2010,TSG RAN WG2 Meeting #69bis, Beijing, CN.
Panasonic, Measurement Configuration Modelling and Other Related Issues, 3GPP Tdoc R2-102760, May 10, 2010, TSG RAN WG2 Meeting #70, Montreal, CA.
Nokia Siemens Networks et al., Carrier Aggregation and the s-Measure Criterion, 3GPP Tdoc R2-102885, May 10, 2010, TSG RAN WG2 Meeting #70, Montreal, CA.
3GPP, Technical Specification 36.304 V8.8.0, User Equipment (UE) Procedures in Idle Mode (Release 8), Dec. 2009, Clause 5.2.
3GPP, Technical Specification 36.331 V8.8.0, Evolved Universal Terrestrial Radio Access (E UTRA) Radio Resource Control (RRC), Protocol Specification (Release 8), Dec. 2009, Clauses 5.5, 6.3.

* cited by examiner

MEASUREMENT HANDLING WITH CARRIER AGGREGATION

BACKGROUND

Carrier Aggregation

The Third Generation Partnership Project (3GPP) Long Term Evolution (LTE) Release 8 (Rel-8) standard for wireless communication systems has recently been finalized, supporting bandwidths up to 20 megahertz (MHz). LTE and High-Speed Packet Access (HSPA) are sometimes called "third generation" (3G) communication systems and are currently being standardized by the 3GPP. The LTE specifications can be seen as an evolution of the current wideband code division multiple access (WCDMA) specifications.

An LTE system uses orthogonal frequency division multiplex (OFDM) as a multiple access technique (called OFDMA) in the downlink (DL) from system nodes to user equipments (UEs). An LTE system has channel bandwidths ranging from about 1.4 MHz to 20 MHz, and supports throughputs of more than 100 megabits per second (Mb/s) on the largest-bandwidth channels. One type of physical channel defined for the LTE downlink is the physical downlink shared channel (PDSCH), which conveys information from higher layers in the LTE protocol stack and to which one or more specific transport channels are mapped. Control information is conveyed by a physical uplink control channel (PUCCH) and by a physical downlink control channel (PDCCH). LTE channels are described in 3GPP Technical Specification (TS) 36.211 V8.4.0, Physical Channels and Modulation (Release 8) (September 2008), among other specifications.

An IMT-Advanced communication system uses an internet protocol (IP) multimedia subsystem (IMS) of an LTE, HSPA, or other communication system for IMS multimedia telephony (IMT). In the IMT advanced system (which may be called a "fourth generation" (4G) mobile communication system), bandwidths of 100 MHz and larger are being considered. The 3GPP promulgates the LTE, HSPA, WCDMA, and IMT specifications, and specifications that standardize other kinds of cellular wireless communication systems.

In order to meet the upcoming IMT-Advanced requirements, 3GPP has initiated work on LTE-Advanced. One of the parts of LTE-Advanced is to support bandwidths larger than 20 MHz. This will be achieved using a concept called "Carrier Aggregation", where multiple carrier components, each of which may be up to 20 MHz wide, are aggregated together. Carrier aggregation is planned for Release 10 (Rel-10) of the 3GPP LTE specifications.

Carrier aggregation implies that an LTE Rel-10 terminal can receive multiple component carriers, where the component carriers have, or at least the possibility to have, the same structure as a Rel-8 carrier. Carrier aggregation is illustrated in FIG. 1, in which 5 bands of 20 MHz each are aggregated together.

Carriers can be aggregated contiguously, like in FIG. 1, or they may be aggregated from discontinuous portions in the frequency domain, such that, e.g., parts of the aggregated carriers may be contiguous, and other aggregated carriers appear somewhere else in the spectrum, as schematically illustrated in FIG. 2.

The artisan will understand that the blocks shown in FIGS. 1 and 2 are compliant with the LTE specifications. With the carrier aggregation concept, it may be possible to support, among other things:

higher bit-rates;
farming of non-contiguous spectrum—e.g., provide high bit-rates and better capacity also in cases when an operator lacks contiguous spectrum;
fast and efficient load balancing between carriers.

It should be noted that carrier aggregation is a user-equipment-centric concept, in that one user equipment (UE) can be configured to use, e.g., the two left-most carriers in FIG. 2, another UE can be configured to use only a single carrier, and a third UE can be configured to use all of the carriers depicted in FIG. 2.

Thus, an eNodeB (eNB) (i.e., an LTE radio base station) may be in control of all four carriers depicted in FIG. 2, but Rel-10 UEs may have different Configured Component Carriers (Configured CCs) that each Rel-10 UE is configured to use. The aggregated carriers may also be available for Rel-8 UEs, meaning that each of the carriers may be independently available for single-cell operation.

A particular and relevant example of a plausible carrier aggregation scenario includes the case when two or more Rel-8 compatible downlink carriers are aggregated for a UE. It should be noted that carrier aggregation is typically and mainly relevant for a Connected UE, which is a UE that is actively involved in transmission to and from an eNB (which can generally be a E-UTRAN base station), and thus has a connection with the eNB controlling the aggregated carriers.

Mobility and Measurements

In Connected mode, mobility (i.e., handovers between cells) is controlled by the network based on, among other things, measurements provided to the network by the UE. Based on measurement reports received from the UE, the eNB may deduce if a handover is needed. If so, the eNB may then issue a handover to another cell, possibly so that the other cell is controlled by another eNB.

Measurement configurations are controlled by the eNB, i.e., the eNB tells the UE, e.g., when to perform measurements, what to measure, and how to report. Such controlling information sent from the eNB to the UE includes, e.g., information of how measurements should be filtered, different thresholds for the triggers that trigger report, what to measure, how to report, and what to include in the report.

The Rel-8 LTE specifications support a versatile measurement model where different events with thresholds can be configured, such that the UE sends measurement reports to the network when, e.g., the relative signal strength between the current "Serving Cell" and a "Neighbor Cell" is changing, such that a handover may be necessary. This can occur, e.g., when the UE moves from one cell to another, as depicted in FIG. 3, which is a plot of received signal level vs. time or distance.

In Rel-8, the "Serving Cell" denotes the cell that the UE is connected to, while the "Neighbor Cell" may be another cell in close proximity on the same frequency (intra-frequency measurements), or on a different frequency (inter-frequency measurements). The neighbor may also use a different Radio Access Technology (inter-RAT measurements).

Rel-8 includes different event-triggers for issuing reports from the UE to the eNB, when certain conditions are fulfilled. For example, Rel-8 includes the trigger Event A3 defined as follows:

Event A3: Neighbor cell becomes amount of offset better than serving cell.

Additional triggers and definitions can be found in the LTE specification, 3GPP Technical Specification (TS) 36.331 V8.8.0, Evolved Universal Terrestrial Radio Access (E-UTRA) Radio Resource Control (RRC), Protocol Specification (Release 8) (December 2009).

In 3GPP TS 25.331 V9.0.0, Radio Resource Control (Release 9) (September 2009), UTRAN trigger events are defined.

For clarity, we here list some of the definitions used in Clause 5.5 of 3GPP TS 36.331:
1. Measurement objects: The objects on which the UE shall perform the measurements.
2. Reporting configurations: A list of reporting configurations including e.g. the aforementioned trigger configurations.
3. Measurement identities: A list of measurement identities where each measurement identity links one measurement object with one reporting configuration.

Additional definitions can be found in Clause 5.5 of 3GPP TS 36.331, for example.

Considering Event A3, it is thus possible to configure an A3-event on a measurement object, such that if any Neighbor on that object grows stronger than the Serving cell (plus some configurable thresholds), then the UE shall send a measurement report that includes information about the measured radio environment of the UE. The report is constructed with relevant information, such that the eNB can decide if a handover is required or at least beneficial.

The Rel-8 measurement object may be the carrier "defined" by the Serving Cell, in which case the Neighbor and Serving are on the same frequency. The term "intra-frequency" is often used. Alternatively, the object may be a different, "inter-frequency" object, as illustrated by FIG. 4.

The same, or different, reporting configurations for A3 (or other) events could be configured for the two objects in the figure.

A characteristic of this Rel-8 model of relevance for the present invention is the fact that the UE has a single Serving Cell.

The s-Measure Parameter

The procedures for measuring on neighbor cells consume UE power. In Rel-8, there has therefore been defined a parameter called s-Measure, by which the measurement activities of a UE can be reduced at times when there is no need to perform neighbor cell search and measurements.

From Clause 6.3.5 of 3GPP TS 36.331:
s-Measure
Serving cell quality threshold controlling whether or not the UE is required to perform measurements of intra-frequency, inter-frequency and inter-RAT neighbouring cells. Value "0" indicates to disable s-Measure.

Thus, a UE needs to perform neighbor-cell measurements only if the quality of the serving cell is below a certain threshold. In Rel-8, the quality is evaluated in terms of the received RSRP (Reference Signal Received Power). If the received signal power from the serving cell is high, then the UE does not need to perform any neighbor cell measurements, as the current serving cell is assumed to be strong enough in absolute terms. FIG. 5 illustrates the use of s-Measure, where the curve is a schematic illustration of received signal level as a function of time or distance.

In IDLE mode, the mobility is UE-controlled, such that the UE selects the best cell to camp upon based on specified criteria and related parameters, where the parameters are typically broadcast in the cell. For LTE, this is described in, for example, Clause 5.2 of 3GPP TS 36.304 V8.8.0, User Equipment (UE) Procedures in Idle Mode (Release 8) (December 2009). This cell selection, where the UE selects one unique cell to camp on, is based on cell search and measurements. Also here, the network may broadcast parameters S-intrasearch and S-nonintrasearch, such that a UE may omit any cell search and measurements for cell selection on intra- and inter-frequency carriers, respectively, if the received quality of the present serving cell is greater than the aforementioned threshold parameters.

A problem with the measurement configuration and event triggers arises when Carrier Aggregation is introduced. Now, a UE may be "served" on multiple frequencies, and there arises an ambiguity of what the "Serving Cell" in FIG. 4 actually is. Specifically, the 3GPP RAN2 working group has recently agreed that each component carrier is a separate measurement object, as illustrated in FIG. 6.

Further reference can be made to 3GPP R2-100826: Report of 3GPP TSG RAN WG2 meeting #68 held Nov. 9-13, 2009.

In terms of the Rel-8 model, the UE now has three serving cells in the illustrated example.

Assume now that a UE is configured with three Component Carriers (CCs). With Rel-8 nomenclature, the UE in FIG. 6 would now have three "Serving Cells". The term "Component Carrier", or CC, may for example be defined as a downlink (DL) frequency that a UE is currently configured with, such that the UE is prepared to receive that DL carrier. In the following the terms "Component Carrier" and "serving cell" will be used more or less interchangeably.

FIG. 7 is a schematic diagram illustrating of an example of a situation when a UE is served by multiple serving cells or carrier components. FIG. 7 shows a first base station 1 and a second base station 2. The first base station 1 is currently a serving base station serving a user equipment, UE, 3 and the second base station 2 is a neighbor base station. As mentioned above, the UE 3 may be configured with multiple serving cells, or so-called component carriers, CCs, which relate to carriers on different frequencies (t).

A particular problem is that it is unclear how the s-Measure evaluation and similar evaluation of the need for neighbor cell measurements for a UE with multiple, aggregated Component Carriers should be performed.

SUMMARY

It is an object to provide improved measurement handling in user equipment configured with multiple downlink component carriers.

This object is met by embodiments as defined by the accompanying patent claims.

In a first aspect, there is provided a method of measurement handling in a user equipment, UE, in connected mode, with the UE being configured with multiple downlink component carriers, CCs. A basic idea is to evaluate the signal quality of a specific CC of the configured CCs against a configurable threshold to determine the need for neighbor cell measurements, and perform neighbor cell measurements if the signal quality of the specific CC is below the configurable threshold.

In this way, robust and efficient measurement handling is provided, even though the UE is configured with multiple component carriers.

In a second aspect, there is provided a control unit for measurement handling in a user equipment, UE, in connected mode, with the UE being configured with multiple downlink component carriers, CCs. The control unit comprises at least one processing circuit configured to evaluate the signal quality of a specific CC of the configured CCs against a configurable threshold to determine the need for neighbor cell measurements, and request neighbor cell measurements if the signal quality of the specific CC is below the configurable threshold.

In a third aspect, there is provided a user equipment, UE, configured for measurement handling in connected mode. The UE is configured with multiple downlink component carriers, CCs. The UE comprises at least one processing circuit configured to evaluate the signal quality of a specific CC of the configured CCs against a configurable threshold to determine the need for neighbor cell measurements, and request neighbor cell measurements to be performed if the signal quality of the specific CC is below the configurable threshold. The UE also comprises at least one measurement circuit configured to perform, if requested, the neighbor cell measurements.

In a fourth aspect, there is provided a non-transitory computer-readable medium having stored therein a set of instructions for performing, when executed by a computer-based system, measurement handling in a user equipment, UE, in connected mode, with the UE being configured with multiple downlink component carriers, CCs. In the measurement handling, the signal quality of a specific CC of the configured CCs is evaluated against a configurable threshold to determine the need for neighbor cell measurements, and neighbor cell measurements are requested to be performed if the signal quality of the specific CC is below the configurable threshold.

In yet another aspect, there is provided a method of measurement handling in a user equipment, UE, in connected mode, with the UE being configured with multiple downlink component carriers, CCs. The UE is configured with multiple thresholds, where each of the thresholds relate to at least one measurement object, and the threshold is used for evaluating, for the CC on the object, whether there is a need to perform neighbor cell measurements on this particular object.

Other advantages offered by the invention will be appreciated when reading the below description of embodiments of the invention.

BRIEF DESCRIPTION OF THE DRAWINGS

The invention, together with further objects and advantages thereof, may best be understood by making reference to this description taken together with the accompanying drawings, in which.

DETAILED DESCRIPTION

Figure 8:
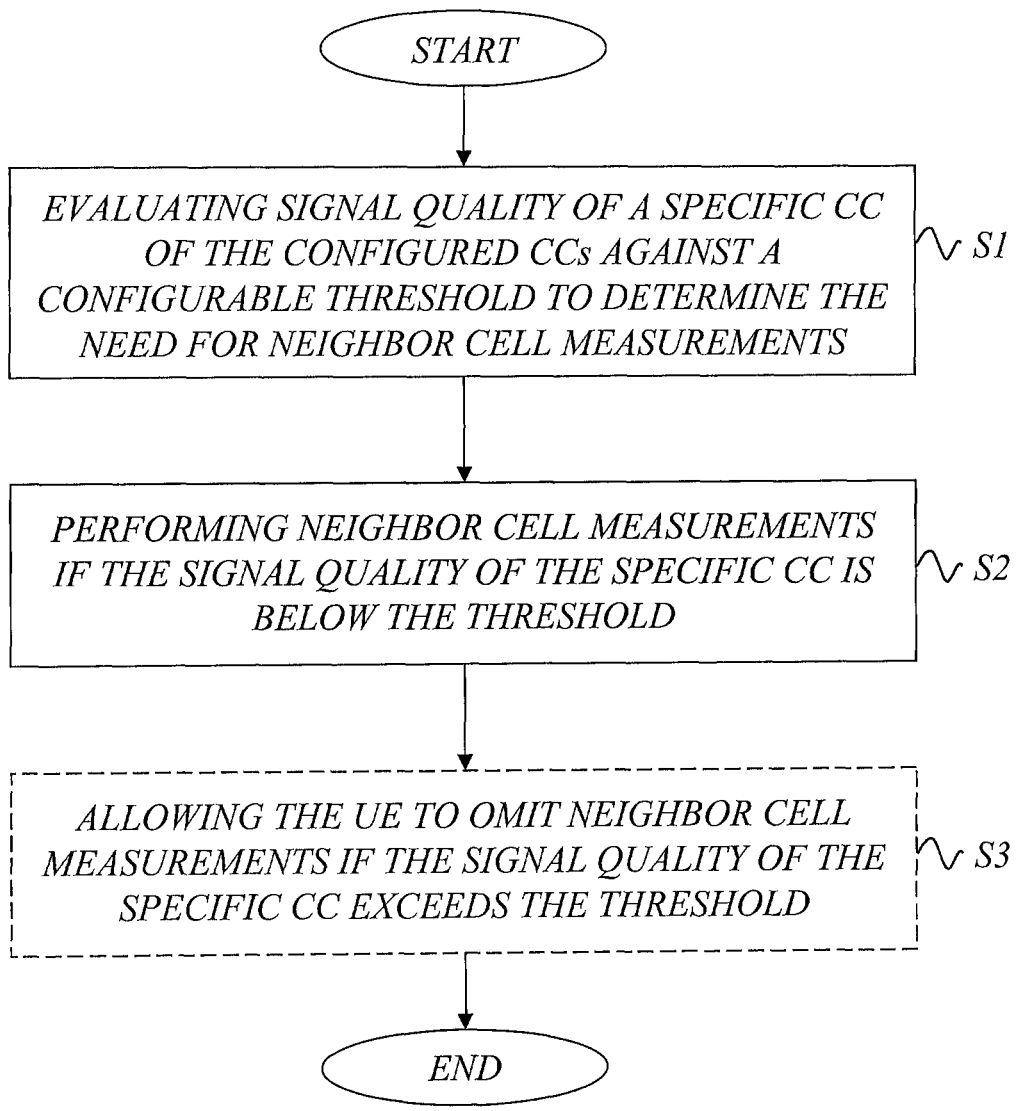
FIG. 8 is a schematic flow diagram illustrating an example of a method for measurement handling according to an embodiment.

FIG. 8 is a schematic flow diagram illustrating an example of a method for measurement handling in a user equipment, UE, in connected mode, with the UE being configured with multiple downlink component carriers, CCs, also referred to as serving cells, according to an embodiment.

Step S1 involves evaluating the signal quality of a specific CC of the configured CCs against a configurable threshold to determine the need for neighbor cell measurements. Step S2 involves performing neighbor cell measurements if the signal quality of the specific CC is below the configurable threshold.

In this way, robust and efficient measurement handling is provided, even though the UE is configured with multiple component carriers.

Normally, as a complementary optional action, the UE is allowed to omit neighbor cell measurements if the signal quality of the specific CC exceeds the configurable threshold, as indicated by the optional step S3 in the flow diagram of FIG. 8.

For example, the UE can receive information representative of the specific CC, with the specific CC being configured using the Radio Resource Control, RRC, protocol. In a particular example, the UE receives information representative of the specific CC, with the specific CC being semi-statically configured in the UE by signaling according to the applicable RRC protocol, such that the UE evaluates the signal quality of this CC against the configurable threshold. The UE can then maintain information about the specific CC as the CC to be evaluated against the threshold.

By way of example, the specific CC to be used for evaluating the need for neighbour cell measurements can be the so-called PCell, or Primary Cell. In particular, the PCell can be used as reference for s-Measure evaluation.

For example, with PCell as the specific CC to be used for evaluating the need for neighbour cell measurements, the following definitions for measurement handling can be used:
- s-Measure is the PCell quality threshold controlling whether or not the UE is required to perform measurements of intra-frequency, inter-frequency and/or inter-RAT (Radio Access Technology) neighboring cells.
- If s-Measure is configured and the PCell quality (such as received power), after suitable filtering, is lower than this value, then perform measurements of neighboring cell(s) on the frequency/frequencies and/or RAT(s) of the concerned measurement object(s).

The PCell can be changed by a handover command from the base station. Thus, the specific CC to be used as reference CC in this particular context can be selected and controlled with higher-layer signaling. For example, the reference CC can be signaled using the Radio Resource Control, RRC, protocol.

The network can thus perform a change of PCell by RRC signaling. For example, in E-UTRAN, the eNB can perform a PCell change by means of the handover procedure, i.e. using an RRCConnectionReconfiguration message including mobilityControlInfo. In the 3GPP document R2-097514: Report of 3GPP TSG RAN WG2 meeting #67bis held Oct. 12-16, 2009, a special cell that provides security input and NAS mobility information was introduced.

In an example embodiment, the UE evaluates the need for measurements on neighbor cells residing on carriers on which the UE has no CC, also referred to as inter-frequency or inter-RAT (Radio Access Technology) measurements by comparing the signal quality of the specific CC to the configurable threshold. The UE can also be required to perform neighbor cell measurements on at least one other carrier on which the UE has a CC, also referred to as intra-frequency measurements.

The need for neighbour cell measurements is normally evaluated with respect to physical layer measurements related to the specific reference CC.

Figure 9:
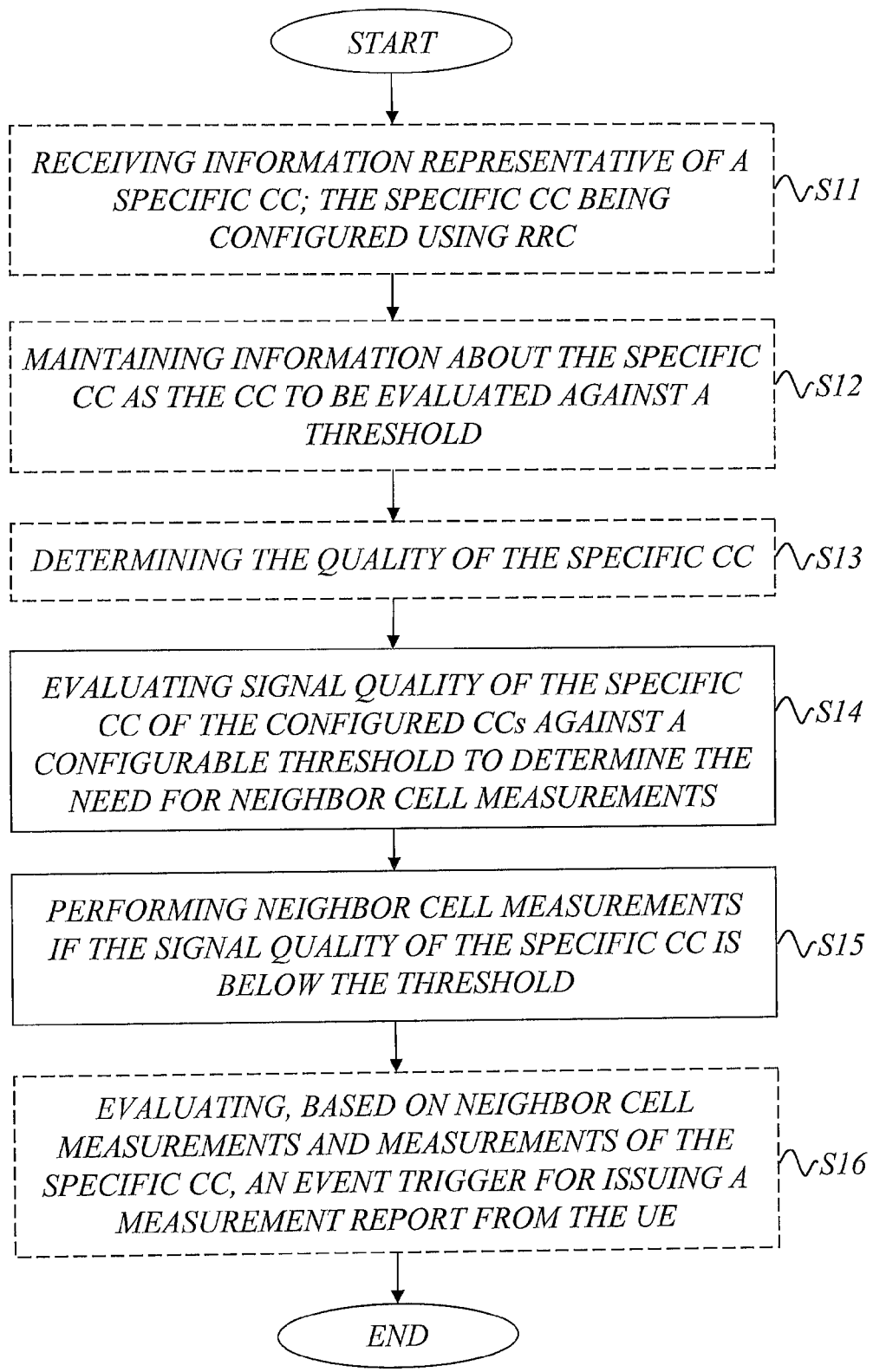
FIG. 9 is a schematic flow diagram illustrating an example of a method for measurement handling according to another embodiment.

FIG. 9 is a schematic flow diagram illustrating an example of a method for measurement handling in a user equipment according to another embodiment. In optional step S11, information representative of a specific CC is received; the specific CC being configured using RRC. In optional step S12, the UE maintains information about the specific CC as the CC to be evaluated against a threshold. In optional step S13, the quality of the specific CC is determined. The quality can be determined based on measurements or based on estimation. The UE can determine the quality, or alternatively the UE can receive this information as input to be used in the measurement handling procedure. In step S14, the UE evaluates the signal quality of the specific CC of the configured CCs against a configurable threshold to determine the need for neighbor cell measurements. In step S15, the UE performs neighbor cell measurements if the signal quality of the specific CC is below the threshold. The complementary action of allowing the UE to omit neighbour cell measurements if the signal quality exceeds the threshold is not illustrated in the flow diagram of FIG. 9. In optional step S16, the UE evaluates, based on the neighbour cell measurements and measurements of the specific CC, an event-trigger for issuing a measurement report from the UE to support network-controlled mobility.

According to an aspect of the present invention, there is thus provided a method of measurement handling in a UE configured with multiple downlink component carriers, where the UE is allowed to omit any measurements on neighboring cells or downlink carriers if the quality of at least one of the Configured Component Carriers exceeds a configurable threshold.

In a particular example, the at least one CC is the best CC of the configured CC. In another example, the at least one CC is semi-statically configured in the UE by signaling according to the applicable RRC protocol, such that the UE evaluates the quality of this CC against the configurable threshold. In another example, the at least one CC can be the CC with the best coverage, the largest bandwidth, the highest bit-rate, or the least required UL power on the corresponding UL carrier.

As previously mentioned, yet another alternative is to use the so-called PCell, or Primary Cell, as a specific reference CC for evaluating the need for neighbor cell measurements.

Furthermore, the measurement omission criteria and thresholds relate to the UE in Connected mode, and the measurements are typically intended for measurement reporting to support network-controlled mobility.

For a better understanding of the invention, it can be useful to review and analyze some of the problems encountered when a UE is served by multiple CCs.

As previously mentioned, a particular problem is that it is unclear how the s-Measure evaluation and similar evaluation of the need for neighbor cell measurements for a UE with multiple, aggregated Component Carriers should be performed.

In Rel-8, the UE is "served" by one downlink carrier against which the s-Measure criterion is evaluated. In Rel-10, the UE may be "served" by multiple downlink CCs, and it is unclear how, or against which of the CCs that the s-Measure criterion or criteria should be evaluated.

It should be noted that carriers having quite diverse propagation conditions can also be aggregated. Thus, the received signal power or quality in the UE of the different component carriers can be quite different. The antennas of the different component carriers can also be oriented differently, meaning that the received power of the component carriers can vary depending on the position of the UE. Thus, it is not evident how the s-Measure criterion should be evaluated when the UE is configured with multiple carriers.

Figure 10:
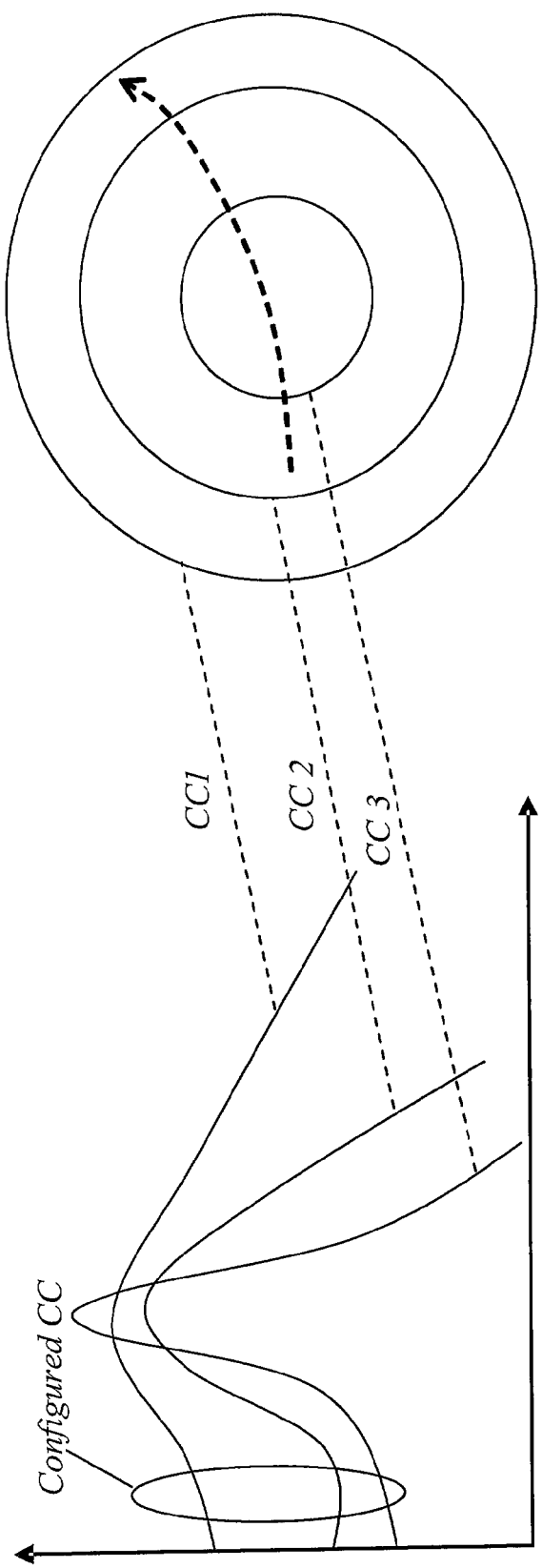
FIGS. 10A-B are schematic diagrams illustrating an example of aggregation of carriers in different-size cells.

This is particularly true for example in deployments where macro-cells and smaller (micro-) cells (or CCs) are aggregated together, as schematically illustrated in FIGS. 10A-B.

It is schematically illustrated how the measured RSRP (Reference Signal Received Power), RSRQ (Reference Signal Received Quality) or similar physical layer measurements of three CCs vary over time (FIG. 10A) as a UE moves along the dotted-line trajectory (FIG. 10B). The CCs are assumed to all be transmitted from antennas in the center of the circles. The circles on the right-hand-side conceptually illustrate the coverage border of the DL carriers that define the three configured CCs.

It can happen as indicated in FIG. 10A that the UE's received signal strength of a first CC (e.g. CC1) is strongest in one position, while another CC (e.g. CC3) is strongest in another. Here, a particular example is shown where the cell (CC3) with the smallest coverage is best in very close proximity to the antennas, which could be the case, e.g., if different down-tilting is used.

Thus, it is unclear what criterion should be evaluated to deduce if the UE is required to perform measurements on neighbor cells.

Figure 11:
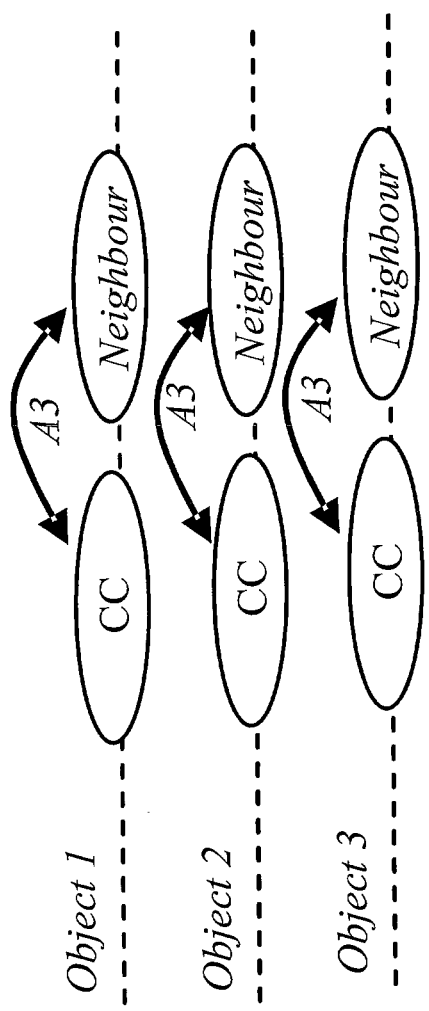
FIG. 11 is a schematic diagram illustrating an example of a possible solution for event evaluation on a carrier that includes a CC.

Another issue concerns the reference carrier for measurement triggering. It is possible that some events will be compared towards an intra-frequency carrier only, as illustrated in FIG. 11.

Figure 12:
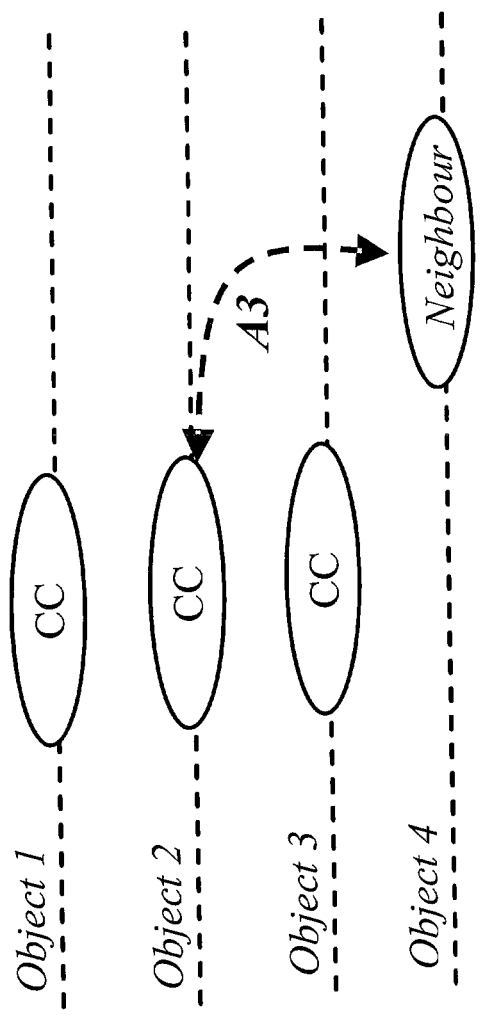
FIG. 12 is a schematic diagram illustrating an example of the problem related to inter-frequency event evaluation.

Such event evaluations can be particularly useful for detecting the interference level on specific carriers on which the UE has a CC. However, all measurement objects do not carry any configured CC. This is true, for example, for inter-frequency and inter-RAT objects. Then, it is possible that, for such measurements, a reference among the configured CCs will be used as illustrated by FIG. 12.

Such inter-frequency or inter-RAT measurement triggers that are evaluated against a Serving Cell in Rel-8 can now be evaluated against one specific CC among the configured CCs. For example, the CC illustrated as the CC on Object 2 in FIG. 12 could be selected based on various different criteria, e.g. such that Object 2 is the best of the CCs, e.g. in terms of RSRP or RSRQ.

With the different reference CCs for intra- and inter-frequency measurements above, it remains unclear if the UE is allowed to stop measurements on all neighbors, if some or all, or some specific CC is above or below some threshold. Clearly, in FIG. 11, the neighbor on Object 1 is compared with the CC on Object 1, while the neighbor on Object 4 in FIG. 12 is compared with the CC on Object 2. It is not clear whether the s-Measure criterion should be evaluated separately for each Object.

It should be noted that the example above is developed using Event A3, but the problems are equally applicable to all other events involving a neighbor on an object.

The "goodness" (i.e., good, better, best, as used here) is determined by evaluating some physical layer measurements, where a stronger physical layer measurement typically, and in current art, indicates that a cell or CC is "better" or "stronger" than the other. The quality is thus normally the signal quality such as received signal power or similar measure of signal strength. In LTE, such measurements include RSRP (Reference Signal Received Power) and RSRQ (Reference Signal Received Quality). However, the present invention is equally applicable to any measurement related to the measured object.

In many cases, the term "cell" can be interchanged with DL carrier, provided the carrier is configured with objects that can be used as CCs for a UE.

As explained, a basic idea is to evaluate the signal quality of a specific CC of the configured CCs against a configurable threshold to determine the need for neighbor cell measurements, and perform neighbor cell measurements only if the signal quality of the specific CC is below the threshold The present invention is now described in detail using specific examples:

In a first aspect of the present invention, there is now a UE that has been configured with multiple CCs. In the example illustrated in FIG. 13, the UE is configured with three CCs.

Figure 13:
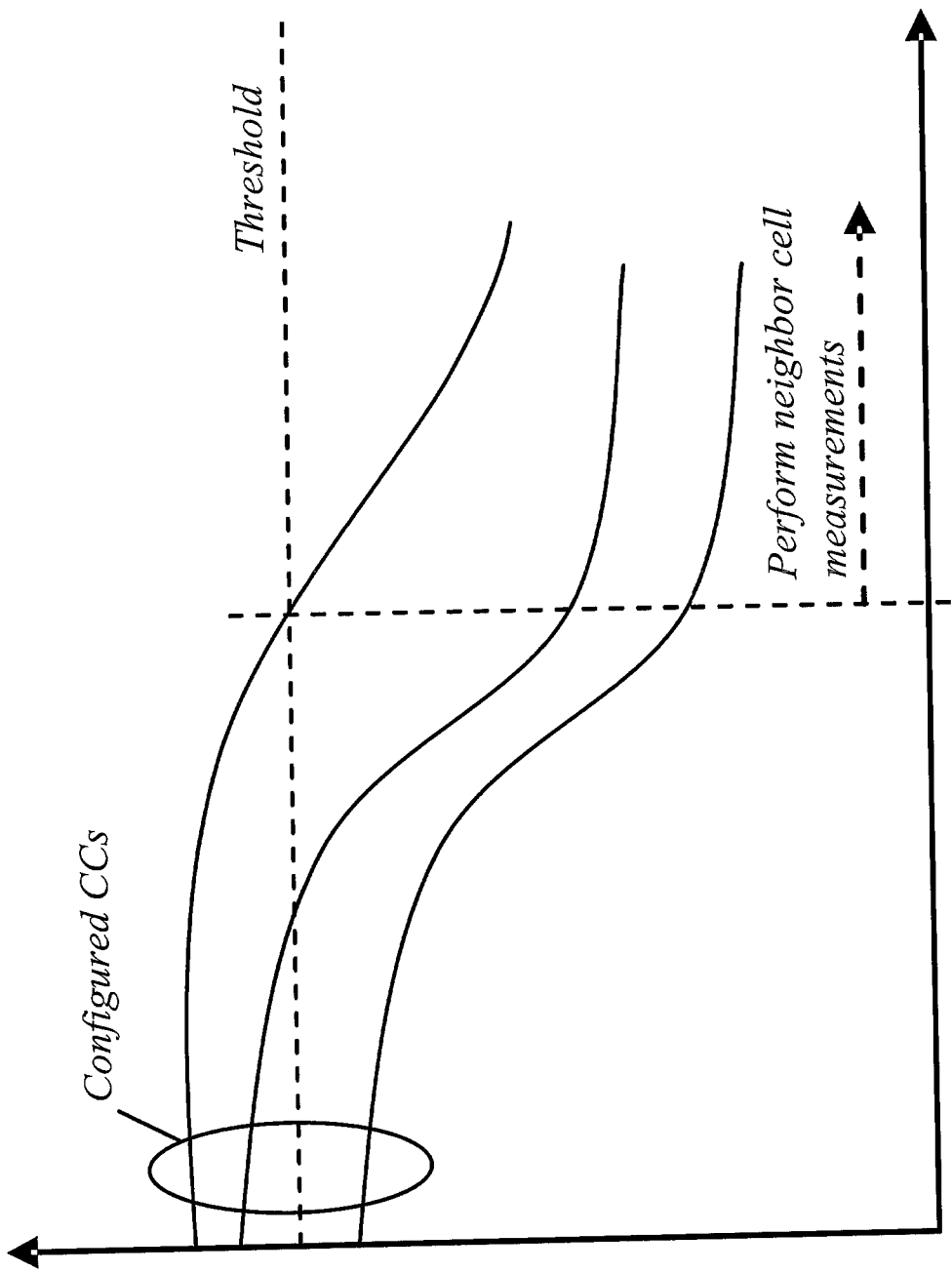
FIG. 13 is a schematic diagram illustrating an example of received signal level vs. time or distance plot for a UE configured with multiple CCs.

In this particular example, there is provided a method of omitting neighbor cell measurements if, e.g., the RSRP power or similar representation of the quality of at least one component carrier exceeds a configurable threshold, as illustrated in FIG. 13. Once the received power of at least one CC (FIG. 13 shows all CCs) drops below the threshold, then the UE is required to perform neighbor cell measurements. Here, it is illustrated that one of the carriers is strongest in absolute terms.

It should be understood that respective, different thresholds related to each of the three carriers can be configured, such that the relative received power or quality of the CCs can be compared. Alternatively, a CC to be evaluated against a threshold can be implicitly or explicitly configurable, e.g., using the RRC protocol. As an example, the so-called PCell, or Primary Cell, can be used as a specific reference CC for evaluating the need for neighbor cell measurements. In yet another alternative, the CC to be used in the evaluation can be based on different criteria related to the CC with the best coverage, the largest bandwidth, the highest bit-rate, or least the required uplink (UL) power on the corresponding UL carrier.

If the power of all, or at least one specific, CC goes below the aforementioned threshold, then the UE is required to perform neighbor cell measurements, e.g., such that configured events like A3, A4, A5, B1, or B2 can be evaluated for neighbor cells. Such an evaluation is illustrated by the example in the previously described FIG. 3 for Event A3.

Figure 1:
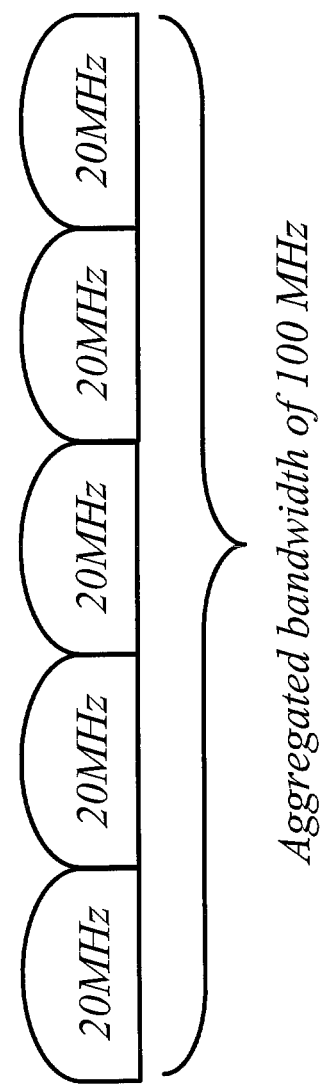
FIG. 1 is a schematic diagram illustrating the concept of carrier aggregation.
Figure 2:
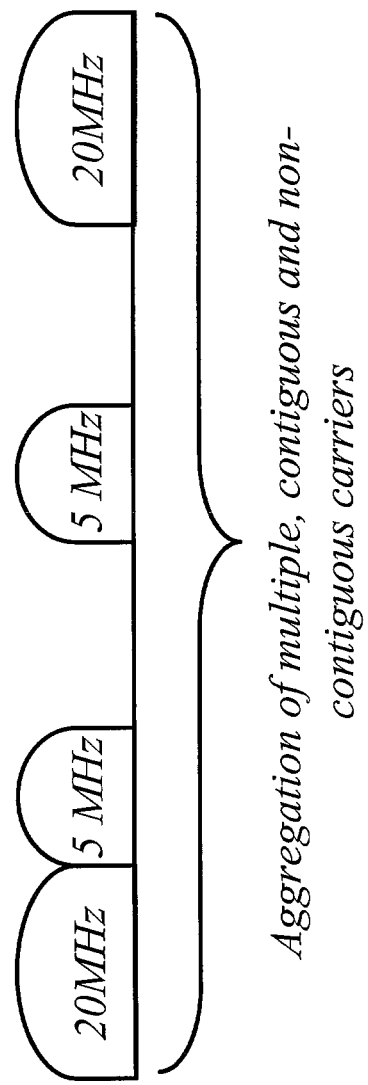
FIG. 2 is a schematic diagram illustrating contiguous and non-contiguous carriers with different bandwidths.
Figure 3:
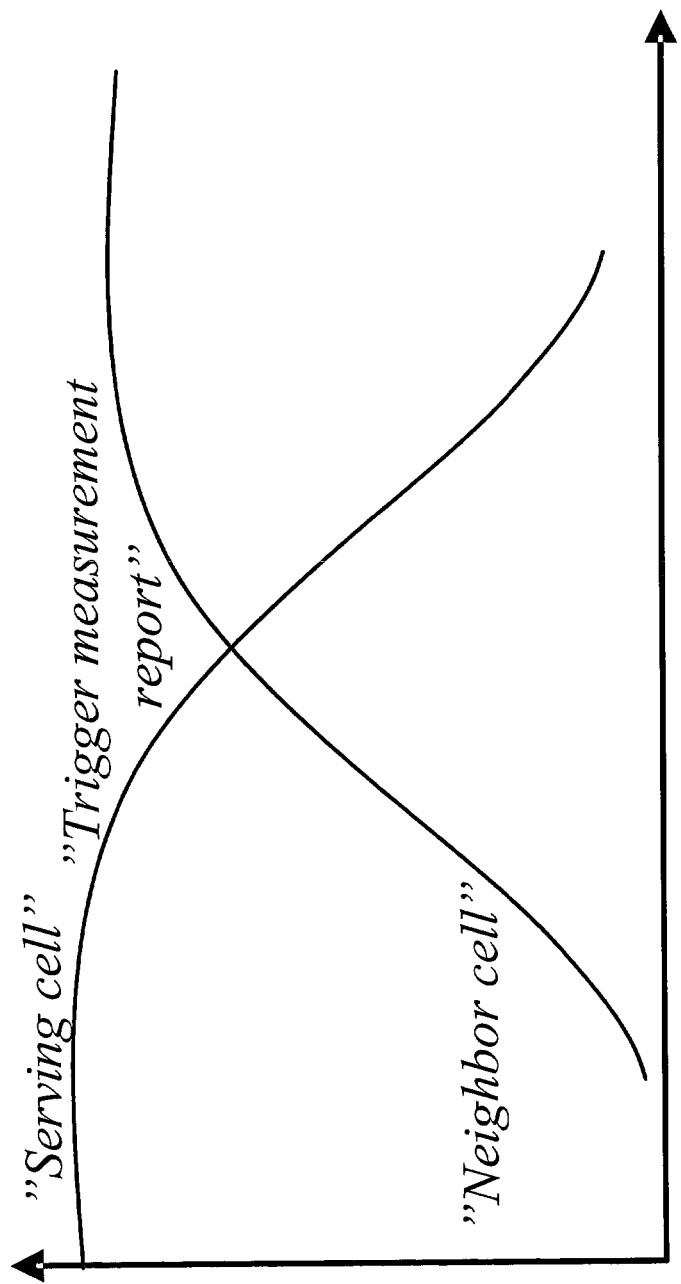
FIG. 3 is a schematic diagram illustrating an example of a handover measurement model.
Figure 4:
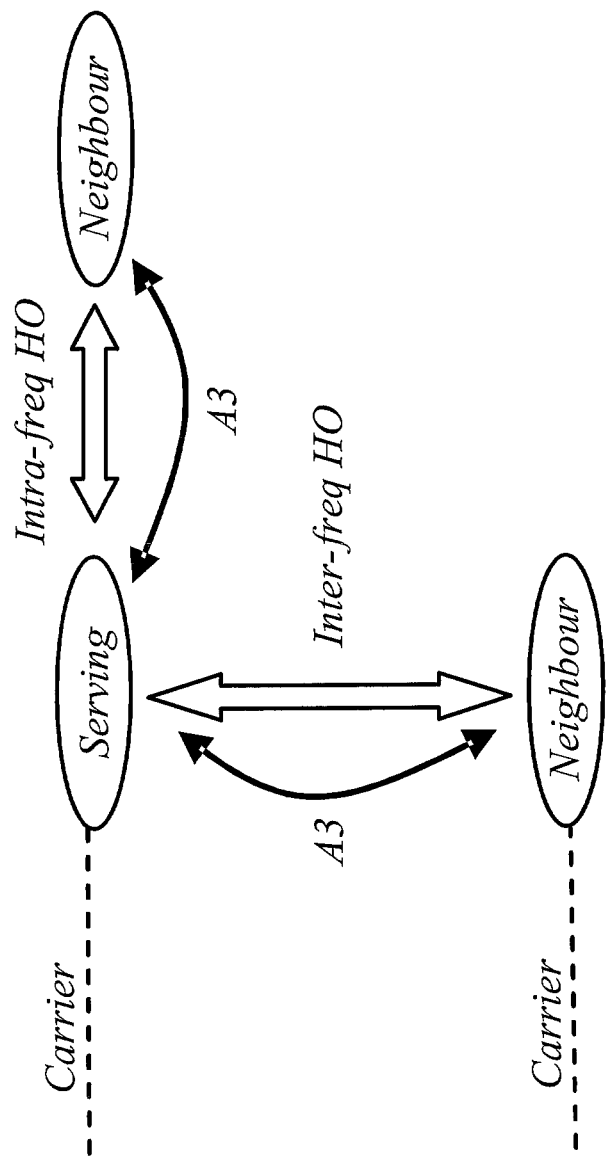
FIG. 4 is a schematic diagram illustrating an example of A3 events applied both to an intra-frequency and inter-frequency object.
Figure 5:
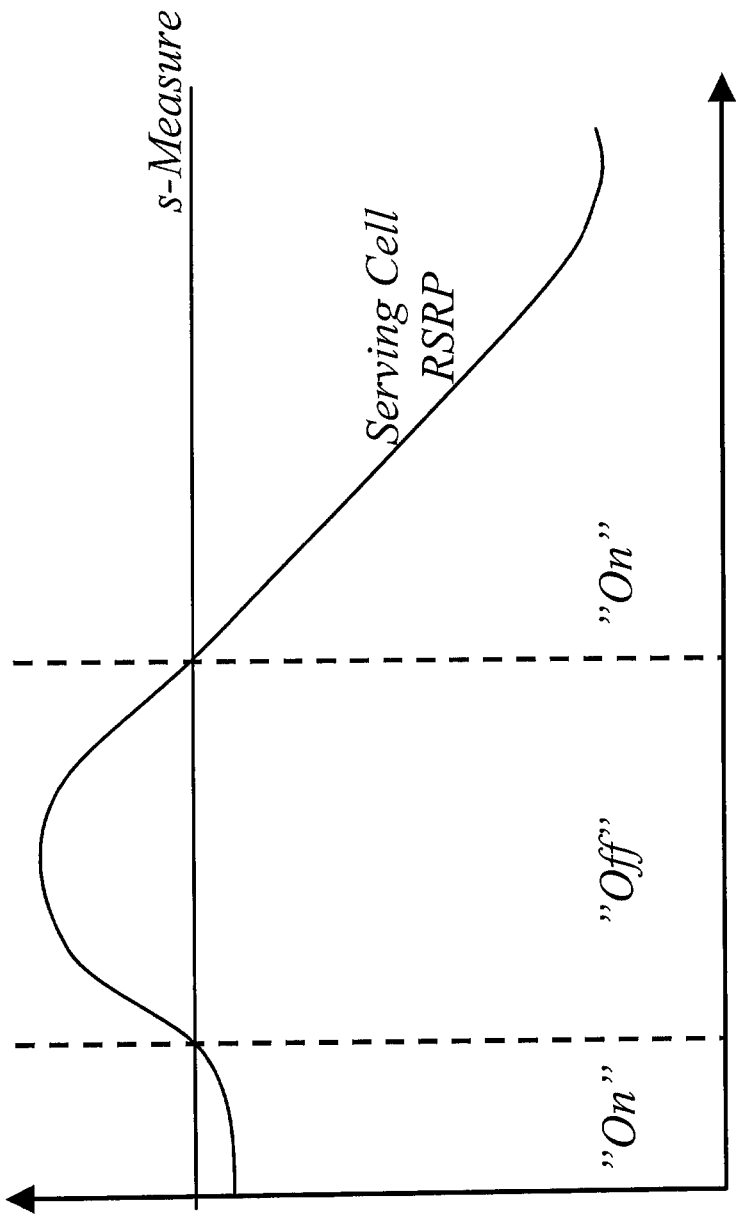
FIG. 5 is a schematic diagram illustrating an example of the use of s-Measure in the form of a plot of received signal level vs. time or distance.
Figure 6:
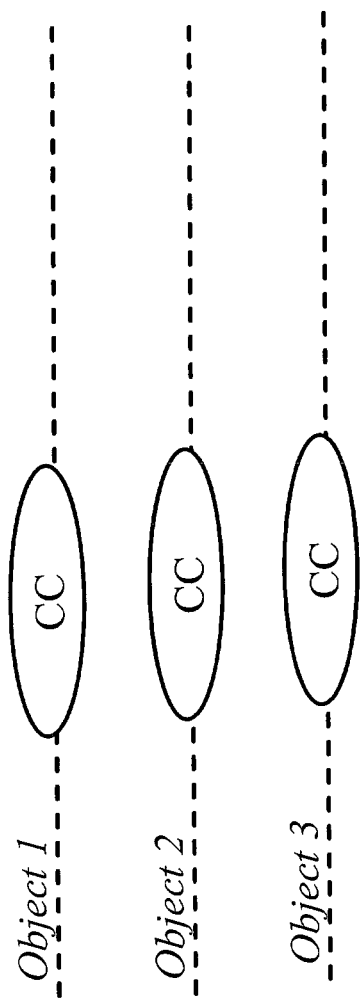
FIG. 6 is a schematic diagram illustrating an example of a situation when a UE is configured with three DL component carriers.
Figure 7:
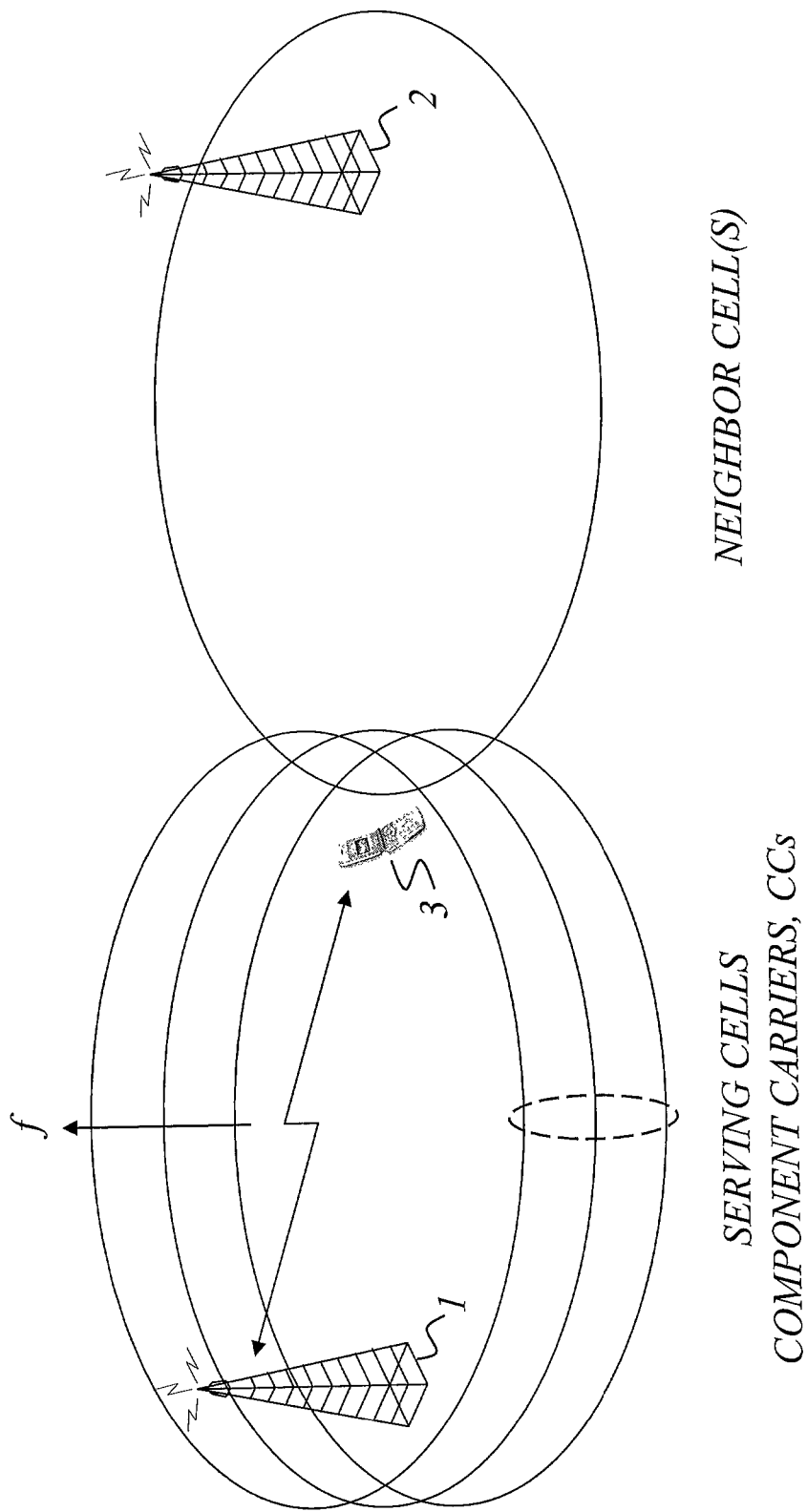
FIG. 7 is a schematic diagram illustrating of an example of a situation when a UE is served by multiple serving cells or carrier components.

FIG. 3 illustrates a situation where a reference cell (here denoted "serving cell", but that can also be the CC that is used in the event evaluation) becomes weaker. It is here assumed that the UE is connected to this ("serving") CC, and a neighbor cell is compared to the aforementioned CC. Now, and as described previously, a UE can be connected to multiple CCs. Thus, in different event evaluations, the reference (denoted "Serving" in the FIG. 3) can be different for various event evaluations.

Figure 14B:
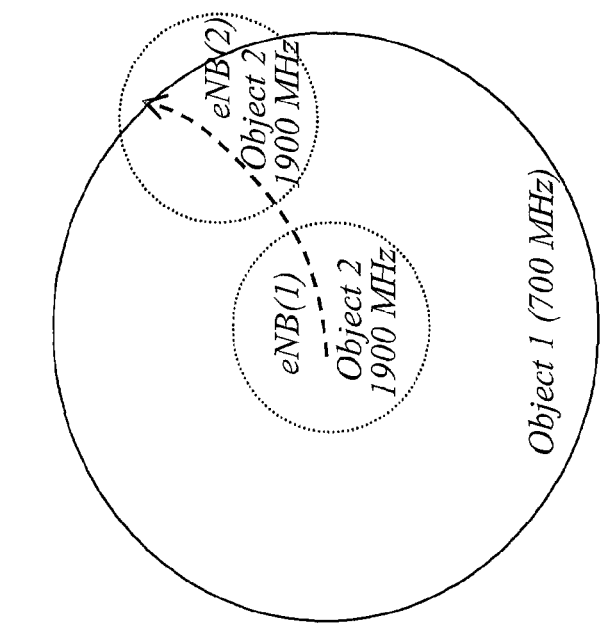
FIGS. 14A-B are schematic diagrams illustrating a situation with CCs on different carrier frequencies.
Figure 14A:
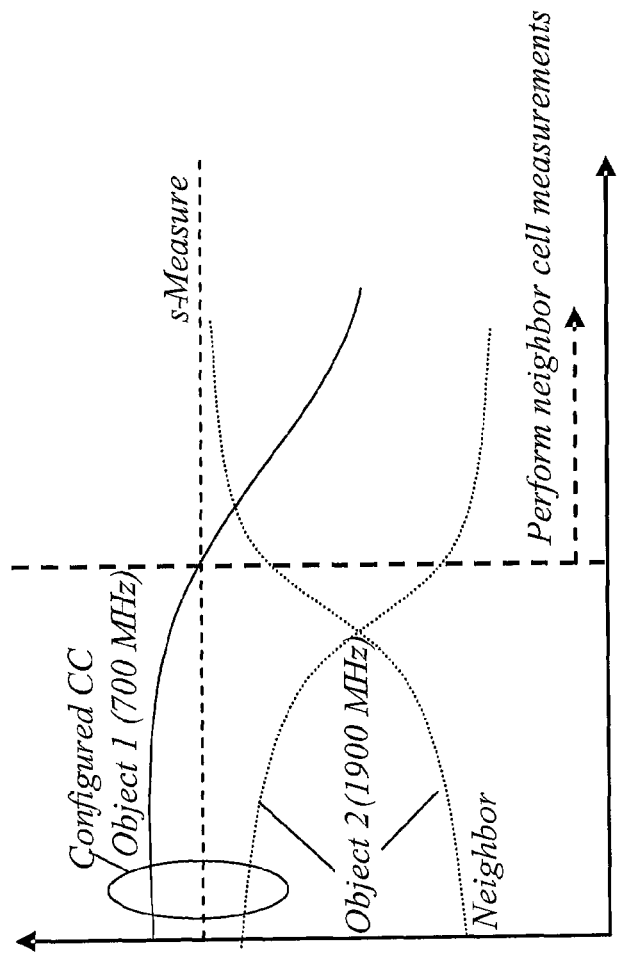

Different references can be needed, e.g., in a network deployment, where a first eNB(1) is controlling two carriers, and a second eNB(2) is controlling one carrier. For illustrative purposes, assume that the first eNB(1) is controlling carriers on 700 MHz and 1900 MHz, and the second eNB(2) is controlling one carrier one 1900 MHz DL carrier only, as illustrated in FIGS. 14A-B. As is generally known in the industry, a 700 MHz carrier has much better coverage compared to a 1900 MHz carrier, which is schematically illustrated in FIG. 14B.

In a manner similar to FIG. 10B, FIG. 14B show an example where a UE is assumed to move from close proximity to eNB(1) toward eNB(2), as illustrated by the dashed line. In this example, the UE is configured with two CCs, one on 700 MHz and another on 1900 MHz, as illustrated in FIG. 14A. As can be seen from FIG. 14B, the 700 MHz CC has much better coverage (i.e., a greater area), partly also covering the 1900 MHz cell controlled by eNB(2). Now, with a single threshold "s-Measure" related to Object 1 (700 MHz), it could happen that the 1900 MHz CC controlled by eNB(2) remains undetected, because the threshold comparison to Object 1 will result in an evaluation concluding that no neighbor cell measurements are required. Thus, a UE can therefore still be scheduled from eNB(1) on the 1900 MHz carrier resulting in severe interference on the neighboring 1900 MHz cell controlled by eNB(2). In addition, it can be impossible for eNB(1) to decide upon any possible handover to eNB(2), to the 1900 MHz carrier, since no such reports identifying this cell has been provided.

Figure 15:
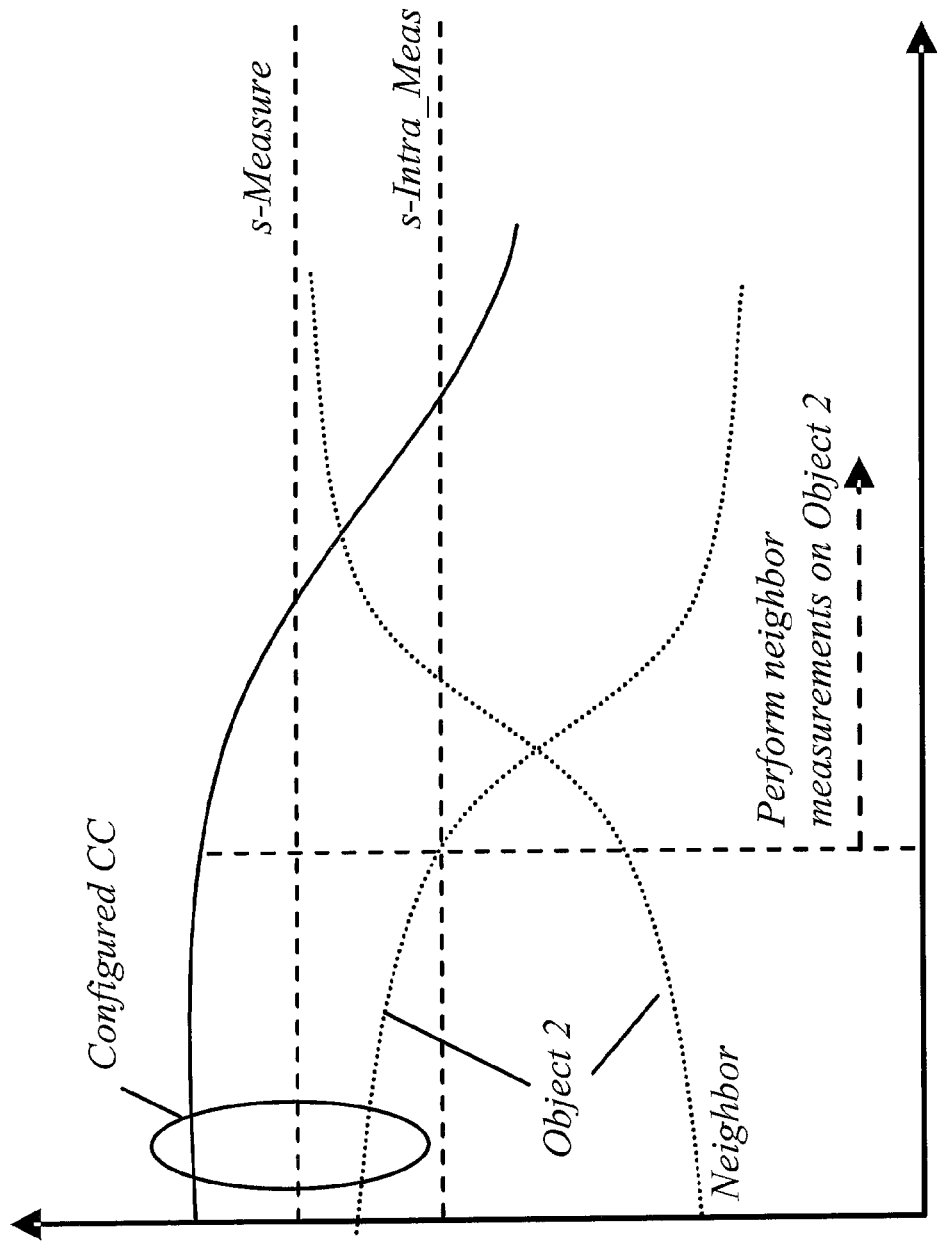
FIG. 15 is a schematic diagram illustrating an example of a situation with multiple CCs and different thresholds.

Thus, according to a further aspect of the present invention, there can be provided in addition to the first described threshold (denoted s-Measure, as before), another threshold related to Object 2, as illustrated by FIG. 15. This other threshold (denoted s-Intra-Meas in FIG. 15), can be specifically related to Object 2, or it can be related to all objects that have a CC configured.

As illustrated by FIG. 15, according to the present invention, there is now a condition where a UE is required to measure on Object 2, if the power or quality of the CC on object 2 falls below the configurable threshold s-Intra-Meas.

Still, the UE can in a particular example embodiment omit any neighbor cell measurements on other objects, provided no conditions related to those other objects require neighbor cell measurements. In the example in FIG. 15, the UE can thus omit any measurements on Object 1 until the s-Measure criterion requires measurements, unless the UE has a configured threshold (s-intra-Meas) specifically associated with Object 1 as well.

As a further example, the UE can omit inter-frequency or inter-RAT measurements, even if neighbor cell measurements on Object 2 are required according to the present invention.

The need for inter-frequency or inter-RAT measurements can be evaluated against the first threshold "s-Measure", where the evaluation is performed for one specific CC of the configured CCs.

Figure 16:
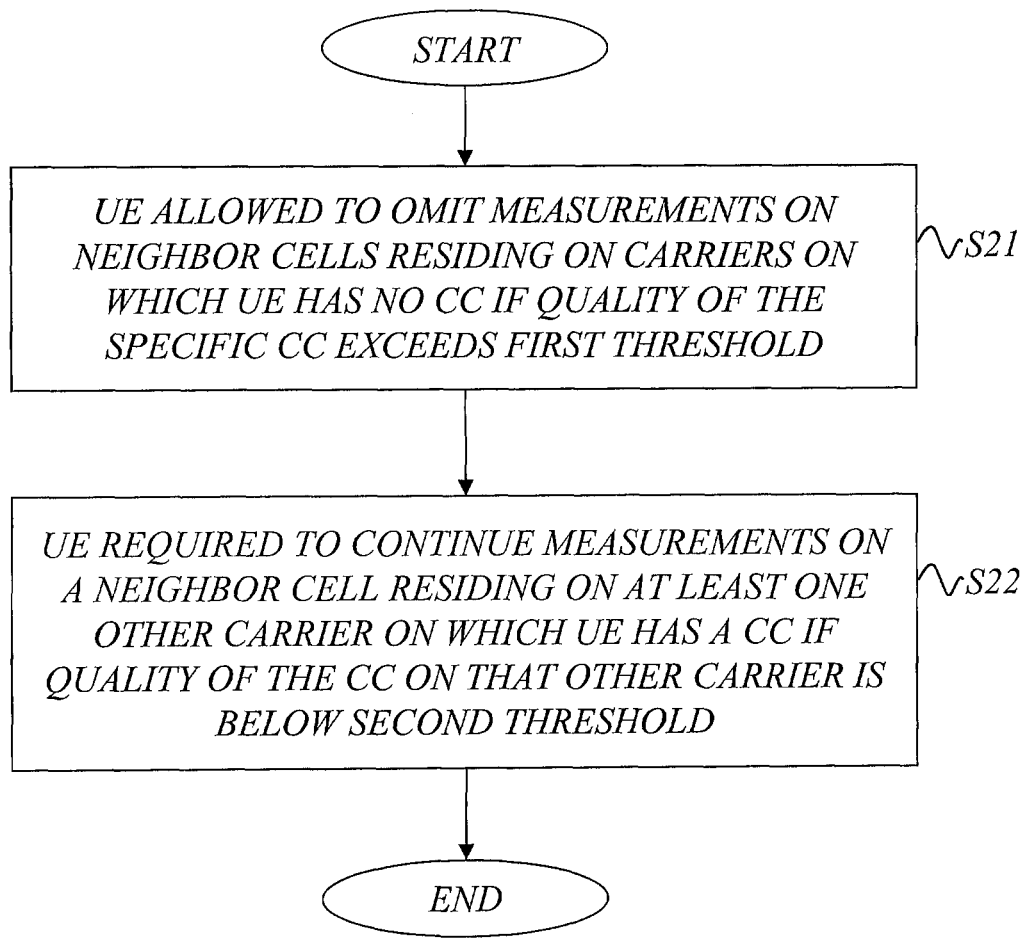
FIG. 16 is a schematic flow diagram illustrating an example of a method for measurement handling according to a particular embodiment.

FIG. 16 is a schematic flow diagram illustrating an example of a method for measurement handling according to a particular embodiment. In step S21, the UE is allowed to omit measurements on neighbor cells residing on carriers on which the UE has no CC, also referred to as inter-frequency or inter-RAT, Radio Access Technology, measurements, if the quality of the specific CC exceeds a configurable first threshold. In step S22, the UE is required to continue measurements on a neighbor cell residing on at least one other carrier on which the UE has a CC, also referred to as intra-frequency measurements, if the quality of the CC on that other carrier is below a second configurable threshold.

According to an aspect of the present invention, there is thus provided a method of measurement handling in a UE configured with multiple downlink component carriers,
  where the UE is allowed to omit measurements on neighbor cells or objects on which the UE has no CC (inter-frequency or inter-RAT measurements), if the quality of at least one CC exceeds a configurable first threshold (the complementary action being to perform the measurements when below the first threshold); and
  the UE is required to continue measurements on a neighbor cell on at least one other object on which the UE has a CC (intra-frequency measurements), if the quality of the CC on that other object is below a second configurable threshold.

In a particular example, the at least one CC is the best CC of the configured CC. In a second example, the at least one CC is semi-statically configured in the UE by RRC-protocol signaling, such that the UE evaluates the quality of this CC against the configurable threshold. In yet another example, separate configurable thresholds are configured for evaluating the need to perform intra-frequency measurements on an object with a CC.

Figure 17:
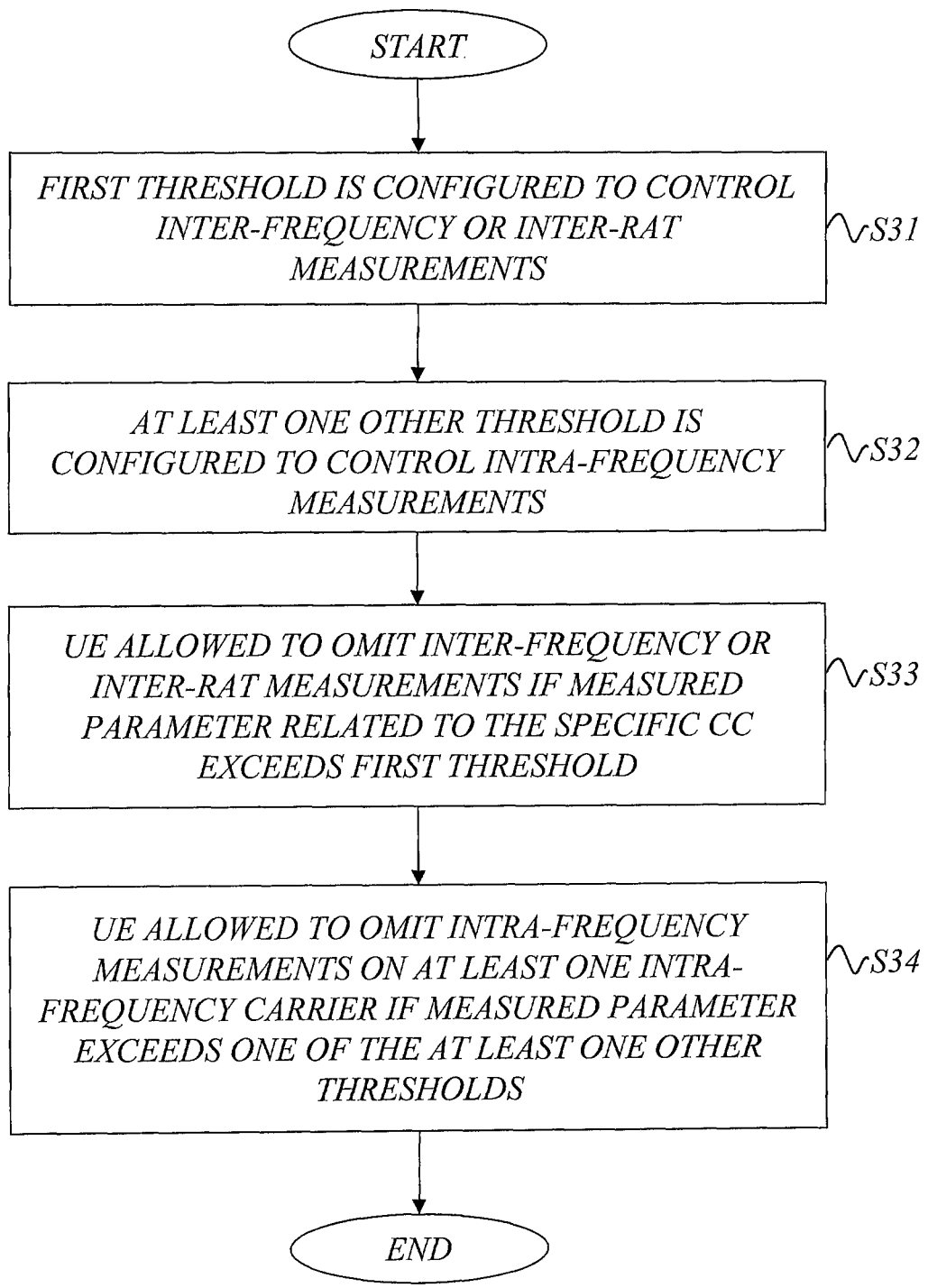
FIG. 17 is a schematic flow diagram illustrating an example of a method for measurement handling according to another particular embodiment

FIG. 17 is a schematic flow diagram illustrating an example of a method for measurement handling according to another particular embodiment. In step S31, a first threshold is configured to control inter-frequency or inter-RAT, Radio Access Technology, measurements. In step S32, at least one other threshold is configured to control intra-frequency measurements. In step S33, the UE is allowed to omit inter-frequency or inter-RAT measurements if a measured parameter related to the specific CC exceeds the first threshold. In step S34, the UE is allowed to omit intra-frequency measurements on at least one intra-frequency carrier, if a measured parameter on the at least one intra-frequency carrier exceeds one of the at least one other configurable threshold.

According to an aspect of the present invention, there is thus provided a method of configuring multiple thresholds determining the necessity for a UE to perform neighbor cell measurements, where
  a first threshold is configured to control inter-frequency or inter-RAT measurements,
  at least one other threshold is configured to control intra-frequency measurements,
  the UE is allowed to omit inter-frequency or inter-RAT measurements if a measured parameter related to one CC exceeds the first threshold (the complementary action being to perform the measurements when below the first threshold), and
  the UE is allowed to omit intra-frequency measurements on at least one intra-frequency object, if a measured parameter on the at least one intra-frequency object exceeds one of the at least one other configurable thresholds (the complementary action being to perform the measurements when below one or more of the at least one other configurable thresholds).

In a particular example, separate intra-frequency thresholds for each intra-frequency object are configured such that the evaluation of the necessity to perform intra-frequency measurements is performed separately for each object. In another particular example, the UE is allowed to omit measurements on an intra-frequency object, if no threshold is configured for specifically to that object, and the measured parameter related to one CC exceeds the first threshold.

Figure 23:
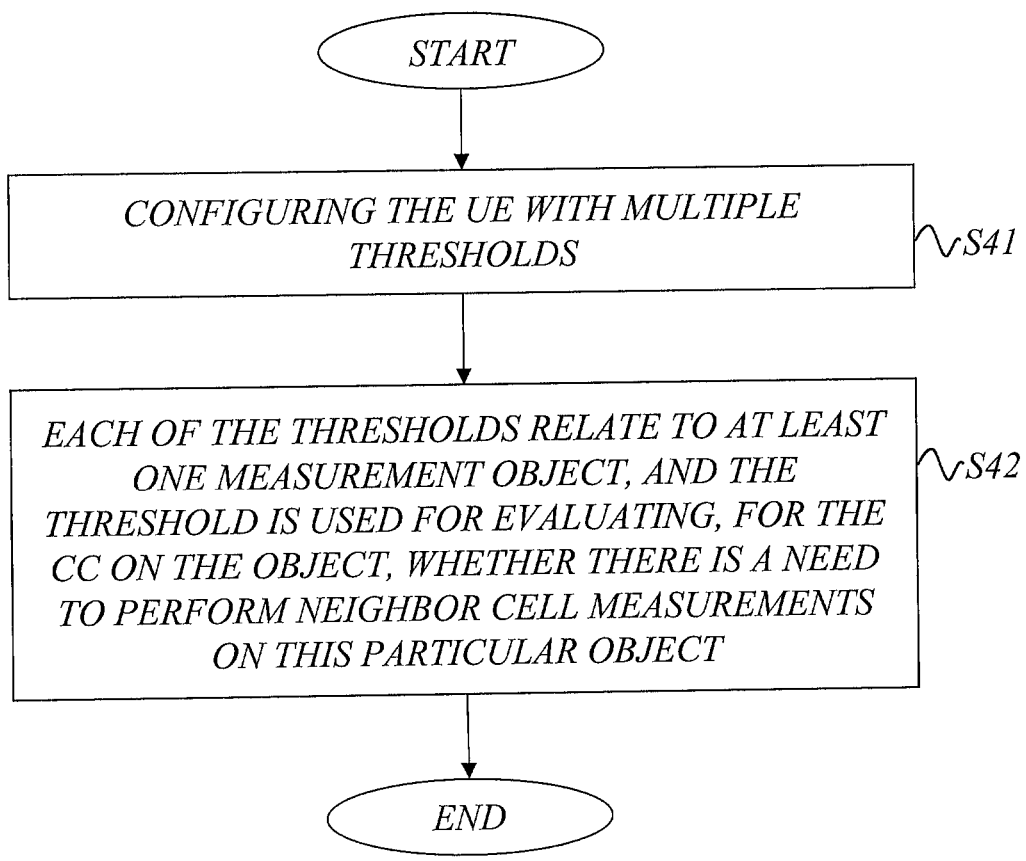
FIG. 23 is a schematic flow diagram of an example of a method for measurement handling in a UE, where the UE is configured with multiple thresholds, according to an embodiment.

Thus, and as already partly described, according to the present invention it shall be possible to configure a UE with multiple thresholds, as illustrated in the schematic flow diagram of FIG. 23. The UE is configured with multiple thresholds (step S41). Each of the thresholds relate to at least one measurement object, and the threshold is used for evaluating whether there is a need to perform neighbor cell measurements on this particular object (step S42). In this evaluation, the CC on that object is used for the evaluation.

According to further aspects of the present invention, apparatus in user equipments and computer-readable media for measurement handling are provided.

Figure 18:
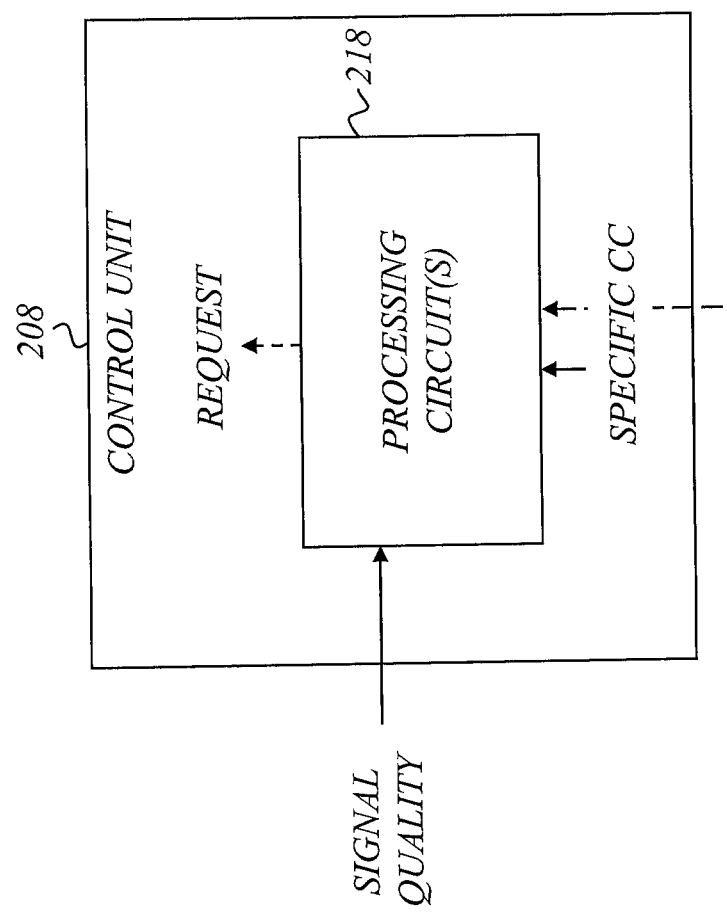
FIG. 18 is a schematic diagram illustrating an example of a control unit for measurement handling according to an embodiment of the invention.

FIG. 18 is a schematic diagram illustrating an example of a control unit for measurement handling according to an embodiment of the invention. The control unit 208 is configured for measurement handling in a user equipment, UE, in connected mode. The UE is configured with multiple downlink component carriers, CCs, also referred to as serving cells. The control unit 208 comprises one or more processing circuits 218 configured to evaluate the signal quality of a specific CC of the configured CCs against a configurable threshold to determine the need for neighbor cell measurements, and request neighbor cell measurements if the signal quality of the specific CC is below the configurable threshold.

The processing circuit(s) 218 is/are typically also configured to allow the UE to omit neighbor cell measurements if the quality of the specific CC exceeds the configurable threshold.

The control unit 208 can be configured to receive information about the specific CC, with the specific CC being configured using for example the Radio Resource Control, RRC, protocol.

For example, the control unit 208 is configured to receive information about the specific CC, with the specific CC being semi-statically configured in the UE by signaling according to the applicable RRC protocol, such that the quality of this CC is evaluated against the configurable threshold.

Alternatively, the control unit 208 decides which one of the configured CCs to use as the specific CC. Anyway, the control unit, or alternatively the UE in which the control unit is arranged, will normally be configured to maintain information about the specific CC as the CC to be evaluated against the threshold. The control unit 208, or the UE, can receive information about the quality of the specific CC, or request measurements of the quality of the specific CC. Once the quality of the specific CC is received, the processing circuit(s) 218 can evaluate the need for neighbor cell measurements.

Normally, the control unit 218 is configured to perform the evaluation with respect to physical layer measurements related to the specific CC, or at least an estimate of the received signal quality of the specific CC.

In an example embodiment, the processing circuit(s) 218 is/are configured to evaluate the need for measurements on neighbor cells residing on carriers on which the UE has no CC, also referred to as inter-frequency or inter-RAT, Radio Access Technology, measurements. For example, the processing circuit(s) 218 can be configured to perform s-Measure evaluation for the specific CC, and configured to evaluate the need for inter-frequency or inter-RAT, Radio Access Technology, measurements against an s-Measure threshold for the specific CC.

In the control unit 208, the processing circuit(s) 218 can include one or more programmed processors configured to perform the measurement handling, as will be explained in more detail later on.

Figure 19:
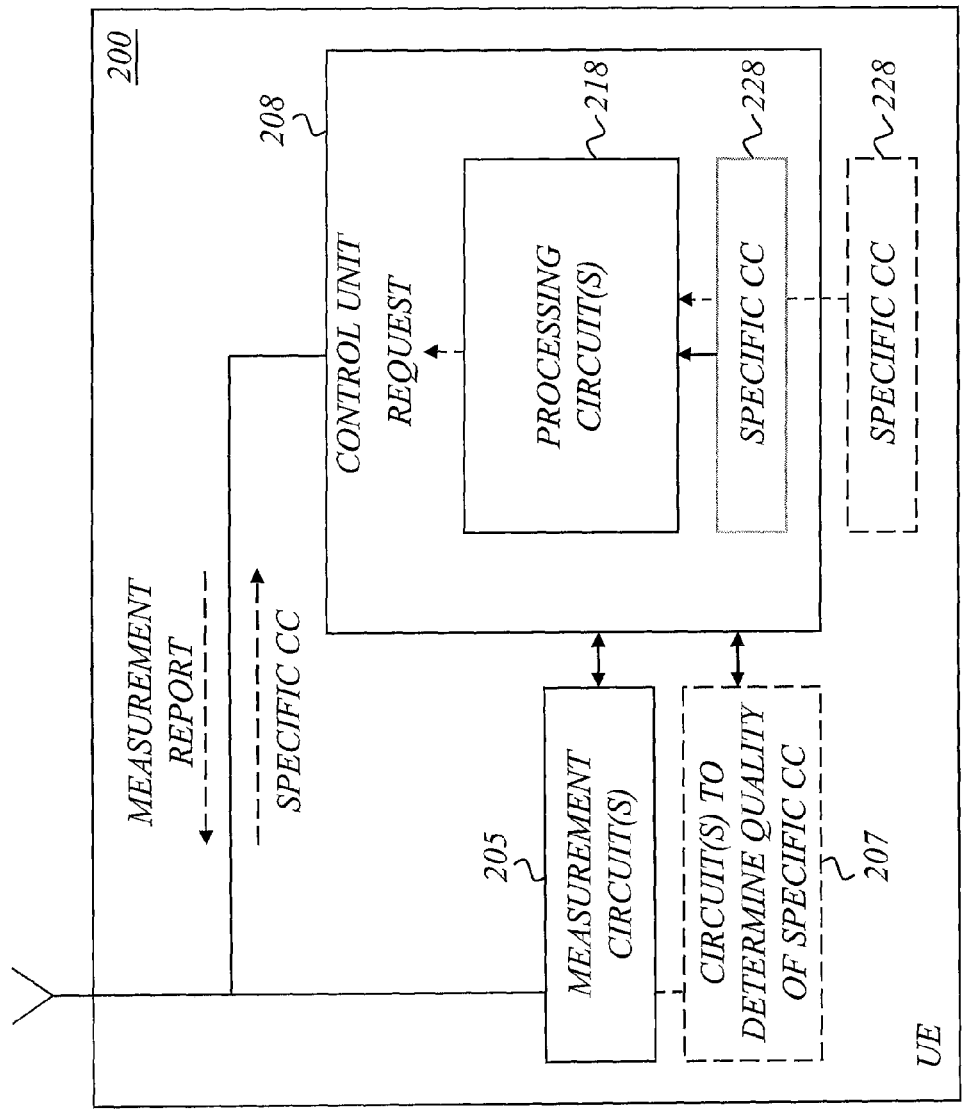
FIG. 19 is a schematic diagram illustrating an example of a user equipment configured for measurement handling according to an embodiment of the invention.

FIG. 19 is a schematic diagram illustrating an example of a user equipment configured for measurement handling in connected mode according to an embodiment of the invention. The UE is configured with multiple downlink component carriers, CCs, also referred to as serving cells. The UE 200 comprises one or more measurement circuits 205, and a control unit 208, which in turn comprises one or more processing circuits 218 for measurement handling. The processing circuit(s) 218 is/are configured to evaluate the signal quality of a specific CC of the configured CCs against a configurable threshold to determine the need for neighbor cell measurements, and request (REQUEST) neighbor cell measurements to be performed if the signal quality of the specific CC is below a configurable threshold. The measurement circuit(s) 205 is/are configured to perform, if requested, the neighbor cell measurements.

The processing circuit(s) 218 is/are typically also configured to allow the UE to omit neighbor cell measurements if the quality of the specific CC exceeds the configurable threshold. In practice, this normally means that suitable control information is generated by the processing circuit(s) 218 so that the UE knows that it is not required to perform neighbor cell measurements.

The UE 200 can be configured to receive information about the specific CC, with the specific CC being configured using for example the Radio Resource Control, RRC, protocol, as previously explained.

For example, the UE is configured to receive information about the specific CC, with the specific CC being semi-statically configured in the UE by signaling according to the applicable RRC protocol, such that the quality of this CC is evaluated against the configurable threshold.

The UE 200 is preferably configured to maintain information about the specific CC as the CC to be evaluated against the threshold. This information can for example be maintained in memory 228, which is typically located within the control unit 208 or located externally to the control unit 208 but still within the UE 200.

In an example embodiment, the processing circuit(s) 218 is/are configured to evaluate the need for measurements on neighbor cells residing on carriers on which the UE has no CC, also referred to as inter-frequency or inter-RAT, Radio Access Technology, measurements.

The UE 200 can also include one or more circuit(s) 207 configured to determine the signal quality of the specific CC, normally determined as received signal strength. The circuit(s) 207 can be integrated in the measurement circuit (s) 208, if desired. The quality information can then be transferred, for example on request, to the control unit 208, and the processing circuit (s) 218 in particular.

Further, the processing circuit(s) 218 can optionally be configured to evaluate, based on the neighbor cell measurements and measurements of the specific CC, an event-trigger for issuing a measurement report from the UE to support network-controlled mobility.

By way of example, the processing circuit(s) 218 includes one or more programmed processors configured to perform the measurement handling. Other implementations will be discussed later on.

The control unit 208 can be configured to perform any of the above-described methods for measurement handling.

Figure 20:
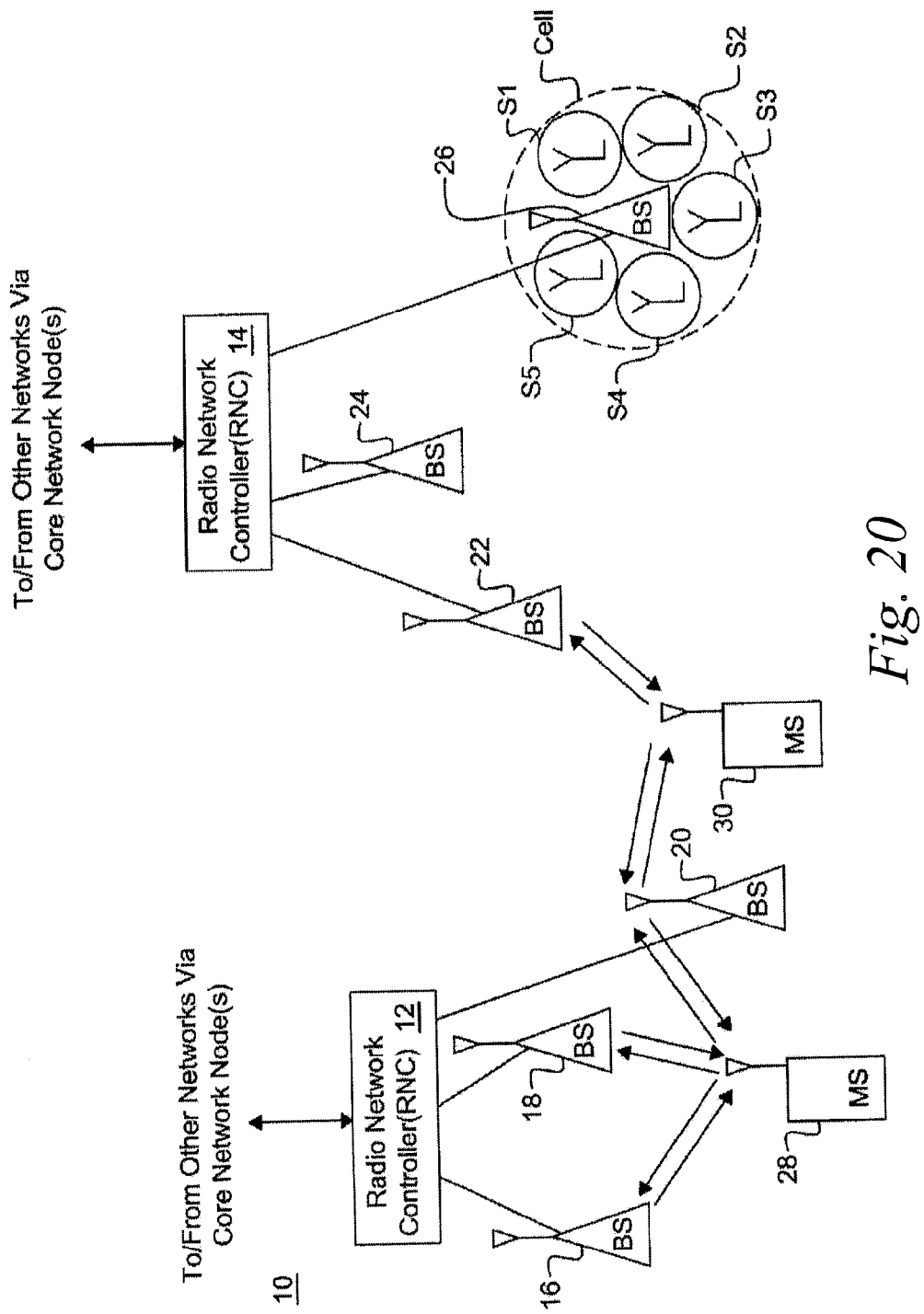
FIG. 20 is a schematic diagram illustrating an example of a typical cellular radio communication system.

FIG. 20 depicts a typical cellular radio communication system 10. Radio network controllers (RNCs) 12, 14 control various radio network functions, including for example radio access bearer setup, diversity handover, etc. In general, each RNC directs calls to and from a UE, such as a mobile station (MS), mobile phone, or other remote terminal, via appropriate base station(s) (BSs), which communicate with each other through DL (or forward) and UL (or reverse) channels. In the example illustrated in FIG. 20, RNC 12 is shown coupled to BSs 16, 18, 20, and RNC 14 is shown coupled to BSs 22, 24, 26. The use of WCDMA nomenclature is merely for facilitating for persons with WCDMA knowledge to understand LTE node functionality.

Each BS, or eNodeB in LTE vocabulary, serves a geographical area that is divided into one or more cell(s). In the example illustrated in FIG. 20, BS 26 is shown as having five antenna sectors S1-S5, which can be said to make up the cell of the BS 26, although a sector or other area served by signals from a BS can also be called a cell. In addition, a BS can use more than one antenna to transmit signals to a UE. The BSs are typically coupled to their corresponding RNCs by dedicated telephone lines, optical fiber links, microwave links, etc. The RNCs 12, 14 are connected with external networks such as the public switched telephone network (PSTN), the internet, etc. through one or more core network nodes, such as a mobile switching center (not shown) and/or a packet radio service node (not shown).

It should be understood that the arrangement of functionalities depicted in FIG. 20 can be modified in LTE and other communication systems. For example, the functionality of the RNCs 12, 14 can be moved to the eNodeBs 22, 24, 26, and other functionalities can be moved to other nodes in the network. It will also be understood that a base station can use multiple transmit antennas to transmit information into a cell/sector/area, and those different transmit antennas can send respective, different pilot signals.

Figure 21:
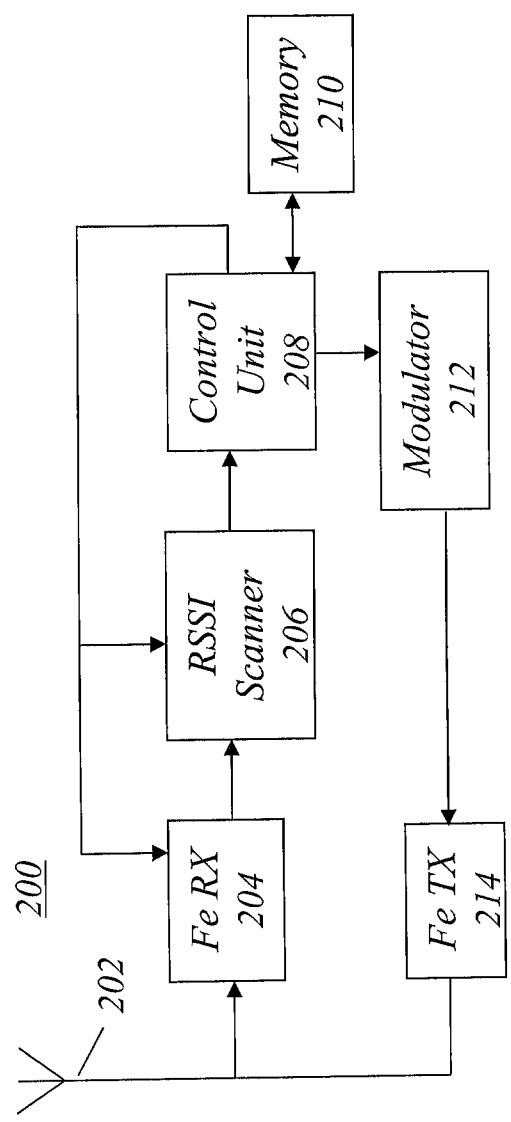
FIG. 21 is a schematic block diagram illustrating an example of a portion of a user equipment according to an embodiment.

FIG. 21 is a block diagram of an example of a portion of a UE 200 that is suitable for implementing the methods described above. For simplicity, only some parts of the UE 200 are shown in the figure. It will also be understood that the UE can be implemented by other arrangements and/or combinations of the functional blocks shown in FIG. 21.

Signals from eNBs are received through an antenna 202 and down-converted to base-band signals by a front-end receiver (Fe RX) 204. On a regular basis for all detected cells, the received signal code power (RSCP) is estimated and the received signal strength indication (RSSI) is computed by an RSSI scanner 206 that operates under the control of a control unit 208. An RSCP can be estimated by, for example, despreading the base-band signal from a detected cell with the scrambling code (and common pilot channel (CPICH) channelization code) corresponding to the cell. In LTE, cell-specific or UE-specific reference symbols can be used. Methods of computing RSSIs are well known in the art. In suitable communication systems, for example, the RSSI can be estimated by computing the variance of the received signal over a given time period.

The control unit 208 uses the RSSI scan information in identifying radio carriers and analyzing the UE's radio environment according to the methods described above. The control unit 208 stores information determined in the analysis in a suitable memory 210, and retrieves stored information as needed. Based on the results of such searches and other information, the control unit 208 controls the operation of the Fe RX 204 and scanner 206 to carry out cell searches and other procedures specified for the wireless communication system as described above. Thus, the Fe RX 204, scanner 206, and control unit 208 form an analyzer configured to analyze received radio signals transmitted by at least one cell in the wireless communication system and to determine information about a radio environment of the receiver by analyzing the received radio signals. It will be appreciated that the UE 200 also typically includes a modulator 212 and a front-end transmitter (Fe TX) 214 and other devices for sending information to the network and using received information.

The control unit 208 and other blocks of the UE 200 can be implemented by one or more suitably programmed electronic processors, collections of logic gates, etc. that processes information stored in one or more memories 210. The stored information can include program instructions and data that enable the control unit to implement the methods described above. It will be appreciated that the control unit typically includes timers, etc. that facilitate its operations.

It will be appreciated that the methods and devices described above can be combined and re-arranged in a variety of equivalent ways, and that the methods can be performed by one or more suitably programmed or configured digital signal processors and other known electronic circuits (e.g., discrete logic gates interconnected to perform a specialized function, or application-specific integrated circuits). Many aspects of this invention are described in terms of sequences of actions that can be performed by, for example, elements of a programmable computer system. UEs embodying this invention include, for example, mobile telephones, pagers, headsets, laptop computers and other mobile terminals, and the like. Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions.

In general, the steps, functions, procedures and/or circuits described above can be implemented in hardware using any conventional technology, such as discrete circuit or integrated circuit technology, including both general-purpose electronic circuitry and application-specific circuitry.

Alternatively, at least some of the steps, functions, procedures and/or blocks described above can be implemented in software for execution by a suitable computer or processing circuit such as a microprocessor, Digital Signal Processor (DSP) and/or any suitable programmable logic device such as a Field Programmable Gate Array (FPGA) device and a Programmable Logic Controller (PLC) device.

It should also be understood that it can be possible to re-use the general processing capabilities of any conventional unit. It can also be possible to re-use existing software, e.g. by reprogramming of the existing software or by adding new software components.

The software can be realized as a computer program product, which is normally carried on a computer-readable medium, for example a CD, DVD, USB memory, hard drive or any other conventional memory device. The software can thus be loaded into the operating memory of a computer for execution by the processor of the computer. The computer/processor does not have to be dedicated to only execute the above-described steps, functions, procedure and/or blocks, but can also execute other software tasks. In the following, an example of a computer implementation of a control unit will be described with reference to FIG. 22.

Figure 22:
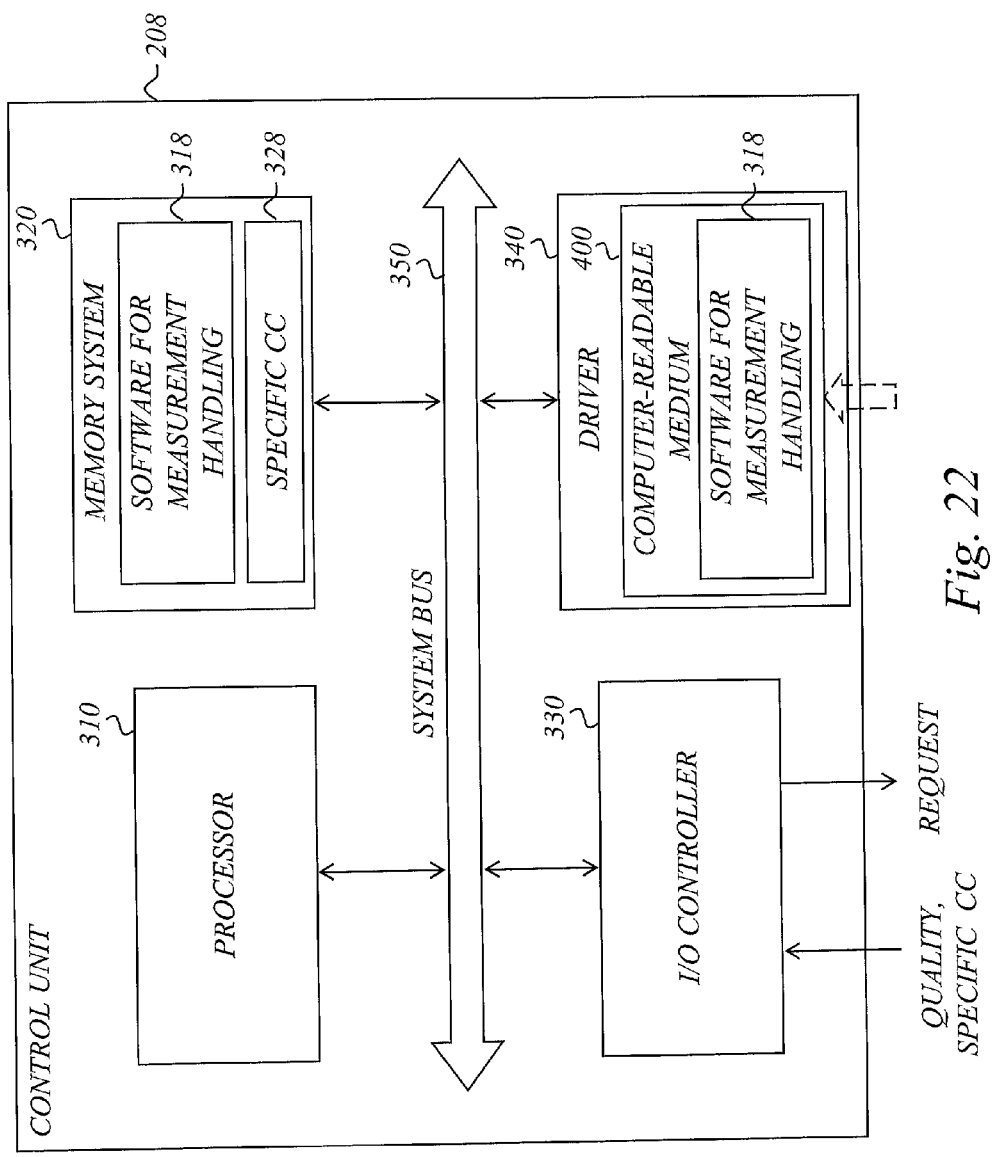
FIG. 22 is a schematic diagram illustrating an example of a computer-implemented control unit for measurement handling, as well as a computer-readable medium according to an embodiment.

FIG. 22 is a schematic diagram illustrating an example of a computer-implemented control unit for measurement event evaluation, as well as a computer-readable medium according to an embodiment. The computer-implemented control unit 208 illustrated in the example of FIG. 19 comprises a processor 310, a memory system 320, an input/output (I/O) controller 330, a driver 340 for a computer-readable medium 400, and a system bus 350.

In this example, the relevant steps, functions and/or procedures for measurement handling are implemented in software 318 to enable evaluation of the need to perform neighbor cell measurements and carried on the computer-readable medium 400.

More particularly, the software includes instructions for performing, when executed by a computer-based system, measurement handling in a UE in connected mode. In the measurement handling to be executed the signal quality of a specific CC of the configured CCs is evaluated against a configurable threshold to determine the need for neighbor cell measurements, and neighbor cell measurements are requested to be performed if the signal quality of the specific CC is below the configurable threshold.

The computer-readable medium 400 is inserted into the driver 340, and the software 318 for measurement handling is loaded into the memory system 320 via the system bus 350. The processor 310 and the memory system 320 are also interconnected via the system bus 350 to enable normal software execution.

The I/O controller 330 is interconnected to the processor and/or the memory system via the system bus 350 or a dedicated I/O bus (not shown) to enable input and/or output of relevant data such as input parameter(s) and/or resulting output parameter(s). More particularly, the I/O controller 330 can receive information about the specific CC as input, for possible storage of this information in a suitable memory location 328 in the memory system 320. The I/O controller 330 can also receive information about the quality of the specific CC as input, and provide a request to perform neighbor cell measurements or complementary information allowing the UE to omit such measurements as output.

The embodiments described above are to be understood as a few illustrative examples of the present invention. It will be understood by those skilled in the art that various modifications, combinations and changes can be made to the embodiments without departing from the scope of the present invention. In particular, different part solutions in the different embodiments can be combined in other configurations, where technically possible. The scope of the present invention is, however, defined by the appended claims.

What is claimed is:

1. A method of measurement handling in a user equipment (UE) in connected mode, the method comprising:
   evaluating a signal quality of a specific component carrier (CC) of a group of multiple downlink CCs against a configurable threshold to determine a need for neighbor cell measurements; and performing neighbor cell measurements if the signal quality of the specific CC is below the configurable threshold;

wherein the UE is configured with each of the multiple downlink CCs of the group, wherein the evaluating and performing steps occur when the UE is in the connected mode, and wherein the UE is allowed to omit measurements on neighbor cells, residing on carriers on which the UE has no CC if the quality of the specific CC exceeds a configurable first threshold; and the UE is required to continue measurements on a neighbor cell residing on at least one other carrier on which the UE has a CC if the quality of the CC on that other carrier is below a second configurable threshold.

2. The method of claim 1, further comprising allowing the UE to omit neighbor cell measurements if the signal quality of the specific CC exceeds the configurable threshold.

3. The method of claim 1, further comprising receiving information representative of the specific CC, the specific CC being configured using a Radio Resource Control protocol.

4. The method of claim 3, further comprising maintaining information about the specific CC as the CC to be evaluated against the threshold.

5. The method of claim 1, wherein the UE evaluates the need for measurements on neighbor cells residing on carriers on which the UE has no CC by comparing the signal quality of the specific CC to the configurable threshold.

6. The method of claim 5, wherein the UE is required to perform neighbor cell measurements on at least one other carrier on which the UE has a CC.

7. The method of claim 1, wherein:
a first threshold is configured to control inter-frequency or inter-Radio-Access Technology (inter-RAT) measurements;
at least one other threshold is configured to control intra-frequency measurements;
the UE is allowed to omit inter-frequency or inter-RAT measurements if a measured parameter related to the specific CC exceeds the first threshold; and
the UE is allowed to omit intra-frequency measurements on at least one intra-frequency carrier if a measured parameter on the at least one intra-frequency carrier exceeds one of the at least one other configurable thresholds.

8. The method of claim 7, wherein separate intra-frequency thresholds for each intra-frequency carrier are configured such that evaluation of the necessity to perform intra-frequency measurements is performed separately for each carrier.

9. The method of claim 1, further comprising determining the signal quality of the specific CC, wherein the signal quality is determined as received signal strength.

10. The method of claim 1, further comprising evaluating, based on the neighbor cell measurements and measurements of the specific CC, an event-trigger for issuing a measurement report from the UE to support network-controlled mobility.

11. A control unit for measurement handling in a user equipment (UE) in connected mode, the control unit comprising;
at least one processing circuit configured to evaluate a signal quality of a specific component carrier (CC) of a group of multiple downlink CCs against a configurable threshold to determine a need for neighbor cell measurements, and to request neighbor cell measurements if the signal quality of the specific CC is below the configurable threshold;

wherein the UE is configured with each of the multiple downlink CCs of the group, and wherein the evaluation and request occur when the UE is in the connected mode; and wherein the UE is allowed to omit measurements on neighbor cells residing on carriers on which the UE has no CC if the quality of the specific CC exceeds a configurable first threshold; and the UE is required to continue measurements on a neighbor cell residing on at least one other carrier on which the UE has a CC if the quality of the CC on that other carrier is below a second configurable threshold.

12. The control unit of claim 11, wherein the at least one processing circuit is configured to allow the UE to omit neighbor cell measurements if the quality of the specific CC exceeds the configurable threshold.

13. The control unit of claim 11, wherein the control unit is configured to receive information about the specific CC, the specific CC being configured using a Radio Resource Control protocol.

14. The control unit of claim 13, wherein the control unit is configured to maintain information about the specific CC as the CC to be evaluated against the threshold.

15. The control unit of claim 11, wherein the at least one processing circuit is configured to evaluate the need for measurements on neighbor cells residing on carriers on which the UE has no CC.

16. The control unit of claim 11, wherein the at least one processing circuit includes at least one programmed processor configured to perform the measurement handling.

17. A user equipment (UE) configured for measurement handling in connected mode, comprising:
at least one processing circuit configured to evaluate a signal quality of a specific component carrier (CC) of a group of multiple downlink CCs against a configurable threshold to determine a need for neighbor cell measurements, and to request neighbor cell measurements to be performed if the signal quality of the specific CC is below a configurable threshold; and
at least one measurement circuit configured to perform, if requested, the neighbor cell measurements;
wherein the UE is configured with each of the multiple downlink CCs of the group, and
wherein the evaluation and request occur when the UE is in the connected mode; and
wherein the UE is allowed to omit measurements on neighbor cells residing on carriers on which the UE has no CC if the quality of the specific CC exceeds a configurable first threshold; and the UE is required to continue measurements on a neighbor cell residing on at least one other carrier on which the UE has a CC if the quality of the CC on that other carrier is below a second configurable threshold.

18. The user equipment of claim 17, wherein the at least one processing circuit is configured to allow the UE to omit neighbor cell measurements if the quality of the specific CC exceeds the configurable threshold.

19. The user equipment of claim 17, wherein the UE is configured to receive information about the specific CC, the specific CC being configured using a Radio Resource Control protocol.

20. The user equipment of claim 19, wherein the UE is configured to maintain information about the specific CC as the CC to be evaluated against the threshold.

21. The user equipment of claim 17, wherein the at least one processing circuit is configured to evaluate the need for measurements on neighbor cells residing on carriers on which the UE has no CC.

22. The user equipment of claim 17, further comprising at least one circuit configured to determine the signal quality of the specific CC, wherein the signal quality is determined as received signal strength.

23. The user equipment of claim 17, wherein the at least one processing circuit is configured to evaluate, based on the neighbor cell measurements and measurements of the specific CC, an event-trigger for issuing a measurement report from the UE to support network-controlled mobility.

24. The user equipment of claim 17, wherein the at least one processing circuit includes at least one programmed processor configured to perform the measurement handling.

25. A non-transitory computer-readable medium having stored therein a set of instructions for measurement handling in a user equipment (UE) in connected mode, which, when executed by a computer-based system, configure the computer-based system to:
   evaluate a signal quality of a specific component carrier (CC) of a group of multiple downlink CCs against a configurable threshold to determine a need for neighbor cell measurements; and
   request neighbor cell measurements are requested to be performed if the signal quality of the specific CC is below the configurable threshold;
   wherein the UE is configured with each of the multiple downlink CCs of the group, and wherein the evaluation and request occur when the UE is in the connected mode; and
   wherein the UE is allowed to omit measurements on neighbor cells residing on carriers on which the UE has no CC if the quality of the specific CC exceeds a configurable first threshold; and the UE is required to continue measurements on a neighbor cell residing on at least one other carrier on which the UE has a CC if the quality of the CC on that other carrier is below a second configurable threshold.

26. A method of measurement handling in a user equipment (UE) in connected mode, comprising:
   using a threshold to evaluate, for a downlink component carrier (CC) on a measurement object to which the threshold relates, whether there is a need to perform neighbor cell measurements on the object;
   wherein the UE is configured with multiple downlink CCs;
   wherein the UE is configured with multiple thresholds, each of which relates to at least one respective measurement object;
   wherein using a threshold to evaluate whether there is a need to perform neighbor cell measurements is performed for each of the multiple thresholds;
   wherein the evaluation occurs when the UE is in the connected mode; and
   wherein the UE is allowed to omit measurements on neighbor cells residing on carriers on which the UE has no CC if the quality of the specific CC exceeds a configurable first threshold; and the UE is required to continue measurements on a neighbor cell residing on at least one other carrier on which the UE has a CC if the quality of the CC on that other carrier is below a second configurable threshold.

\* \* \* \* \*

UNITED STATES PATENT AND TRADEMARK OFFICE
CERTIFICATE OF CORRECTION

PATENT NO. : 9,042,835 B2
APPLICATION NO. : 12/972460
DATED : May 26, 2015
INVENTOR(S) : Sagfors et al.

It is certified that error appears in the above-identified patent and that said Letters Patent is hereby corrected as shown below:

On the title page, item (73), delete "TECHOLOGY," and insert -- TECHNOLOGY, --, therefor.

In the specification

Column 4, Line 30, delete "frequencies (t)." and insert -- frequencies (f). --, therefor.

Column 9, Line 45, delete "threshold" and insert -- threshold. --, therefor.

Column 13, Line 1, delete "control unit 218" and insert -- control unit 208 --, therefor.

Column 13, Line 67, delete "208, if" and insert -- 205, if --, therefor.

In the claims

Column 17, Line 9, Claim 1, delete "cells," and insert -- cells --, therefor.

Column 17, Lines 59-60, Claim 11, delete "comprising;" and insert -- comprising: --, therefor.

Signed and Sealed this
Fifteenth Day of March, 2016

Michelle K. Lee
*Director of the United States Patent and Trademark Office*